(12) United States Patent
Takeoka et al.

(10) Patent No.: US 12,303,995 B2
(45) Date of Patent: May 20, 2025

(54) FRICTION STIR SPOT WELDER AND METHOD OF OPERATING FRICTION STIR SPOT WELDER

(71) Applicant: KAWASAKI JUKOGYO KABUSHIKI KAISHA, Kobe (JP)

(72) Inventors: Naoki Takeoka, Kobe (JP); Yoshitaka Muramatsu, Kobe (JP); Ryoji Ohashi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 74 days.

(21) Appl. No.: 18/032,198

(22) PCT Filed: Oct. 15, 2021

(86) PCT No.: PCT/JP2021/038225
§ 371 (c)(1),
(2) Date: Apr. 17, 2023

(87) PCT Pub. No.: WO2022/080483
PCT Pub. Date: Apr. 21, 2022

(65) Prior Publication Data
US 2023/0390860 A1    Dec. 7, 2023

(30) Foreign Application Priority Data

Oct. 15, 2020   (JP) ................................. 2020-174152

(51) Int. Cl.
*B23K 20/12*       (2006.01)
*B23K 103/20*      (2006.01)

(52) U.S. Cl.
CPC ........ *B23K 20/123* (2013.01); *B23K 20/1255* (2013.01); *B23K 20/1265* (2013.01); *B23K 20/126* (2013.01); *B23K 2103/20* (2018.08)

(58) Field of Classification Search
None
See application file for complete search history.

(56) References Cited

U.S. PATENT DOCUMENTS

| | | | |
|---|---|---|---|
| 8,950,650 B2 * | 2/2015 | Okada .................. | B23K 20/122 |
| | | | 228/2.1 |
| 9,095,926 B2 * | 8/2015 | Okada .................. | B23K 20/123 |
| 10,201,873 B2 * | 2/2019 | Okada .................. | B23K 20/124 |
| 10,919,108 B2 * | 2/2021 | Okada .................. | B23K 20/126 |
| 2022/0105589 A1 | 4/2022 | Sekiguchi et al. | |

FOREIGN PATENT DOCUMENTS

| | | | | |
|---|---|---|---|---|
| EP | 1884308 A1 * | 2/2008 | ........... | B23K 20/125 |
| JP | 2007118061 A * | 5/2007 | | |
| JP | 2020-127954 A | 8/2020 | | |

* cited by examiner

*Primary Examiner* — Devang R Patel
(74) *Attorney, Agent, or Firm* — Oliff PLC

(57) ABSTRACT

A friction stir spot welder includes a pin, a shoulder, a rotary driver, an advance-retract driver, and circuitry. When a preset and predetermined first period of time has elapsed in a state where a speed of the rotating shoulder in an axial direction or a speed of the pin in the axial direction is a preset and predetermined first speed, the circuitry determines that the tip of the shoulder or the tip of the pin has reached a contact surface of a second workpiece which is in contact with a first workpiece.

8 Claims, 19 Drawing Sheets

FRICTION STIR SPOT WELDER AND METHOD OF OPERATING FRICTION STIR SPOT WELDER

CROSS-REFERENCE TO RELATED APPLICATIONS

This is a U.S. National Phase Application of PCT/JP2021/038225 filed on Oct. 15, 2021, which designates the United States and claims priority to Japanese Patent Application No. 2020-174152, filed Oct. 15, 2020, the entire contents of which are incorporated herein by reference.

TECHNICAL FIELD

The present specification discloses a friction stir spot welder and a method of operating the friction stir spot welder.

BACKGROUND ART

Known is a different-metals welding method of welding a first metal member and a second metal member to each other with high quality regardless of variations of the thicknesses of the first and second metal members (see PTL 1, for example).

PTL 1 focuses on the fact that in the different-metals welding method, when a pin forms a through hole on the second metal member, and then, gets into the first metal member, the load of a driving source (motor) that rotates the pin or moves the pin in an axial direction rapidly increases. Then, when the load of the driving source (motor) that rotates the pin or moves the pin in the axial direction rapidly increases, a current supplied to the driving source (motor) rapidly increases.

Therefore, PTL 1 describes that in the different-metals welding method, when a change amount of current supplied to the driving source exceeds a predetermined threshold, it can be determined that the pin has gotten into the first metal member.

CITATION LIST

Patent Literature

PTL 1: Japanese Laid-Open Patent Application Publication No. 2020-127954

SUMMARY OF INVENTION

Technical Problem

However, since an increase in the change amount of current supplied to the driving source is instantaneous, the above determination may be difficult. Therefore, even in the different-metals welding method disclosed in PTL 1, there is still room for improvement.

The present applicant intends to provide a friction stir spot welder and a method of operating the friction stir spot welder, each of which can more clearly determine that a tip of a shoulder or a tip of a pin has reached a contact surface of a second workpiece which is in contact with a first workpiece, than the different-metals welding method disclosed in PTL 1.

Solution to Problem

In order to solve the above problems, a preferred friction stir spot welder is a friction stir spot welder that softens a workpiece including a first workpiece and a second workpiece by frictional heat to weld the workpiece. The friction stir spot welder includes: a pin that is columnar; a shoulder that is cylindrical, the pin being within the shoulder; a rotary driver that rotates the pin and the shoulder about an axis that coincides with a center axis of the pin; an advance-retract driver that advances and retracts the pin and the shoulder along the axis; and circuitry. The first workpiece is located so as to be opposed to the pin and the shoulder and includes a material that is lower in melting point than a material of the second workpiece.

The circuitry operates the rotary driver and the advance-retract driver such that the pin and the shoulder press a welded portion of the workpiece while rotating.

The circuitry operates the rotary driver and the advance-retract driver such that the pin and the shoulder stir the workpiece.

When a preset and predetermined first period of time has elapsed in a state where a speed of the rotating shoulder in an axial direction or a speed of the rotating pin in the axial direction is a preset and predetermined first speed, the circuitry determines that a tip of the shoulder or a tip of the pin has reached a contact surface of the second workpiece which is in contact with the first workpiece.

With this, the circuitry can more clearly determine that the tip of the shoulder or the tip of the pin has reached the contact surface of the second workpiece which is in contact with the first workpiece.

Moreover, a method of operating a friction stir spot welder is a method of operating a friction stir spot welder that softens a workpiece including a first workpiece and a second workpiece by frictional heat to weld the workpiece. The friction stir spot welder includes: a pin that is columnar; a shoulder that is cylindrical, the pin being within the shoulder; a rotary driver that rotates the pin and the shoulder about an axis that coincides with a center axis of the pin; an advance-retract driver that advances and retracts the pin and the shoulder along the axis; and circuitry. The first workpiece is located so as to be opposed to the pin and the shoulder and includes a material that is lower in melting point than a material of the second workpiece.

The method includes:
operating by the circuitry the rotary driver and the advance-retract driver such that the pin and the shoulder press a welded portion of the workpiece while rotating;
operating by the circuitry the rotary driver and the advance-retract driver such that the pin and the shoulder stir the workpiece; and
when a preset and predetermined first period of time has elapsed in a state where a speed of the rotating shoulder in an axial direction or a speed of the rotating pin in the axial direction is a preset and predetermined first speed, determining by the circuitry that a tip of the shoulder or a tip of the pin has reached a contact surface of the second workpiece which is in contact with the first workpiece.

With this, the circuitry can more clearly determine that the tip of the shoulder or the tip of the pin has reached the contact surface of the second workpiece which is in contact with the first workpiece.

The preferred friction stir spot welder and the method of operating the friction stir spot welder will be made clear by the detailed description of the preferred embodiments below with reference to the drawings.

Advantageous Effects of Invention

The friction stir spot welder and the method of operating the friction stir spot welder can more clearly determine that the tip of the shoulder or the tip of the pin has reached the contact surface of the second workpiece which is in contact with the first workpiece.

DESCRIPTION OF EMBODIMENTS

Figure 1:
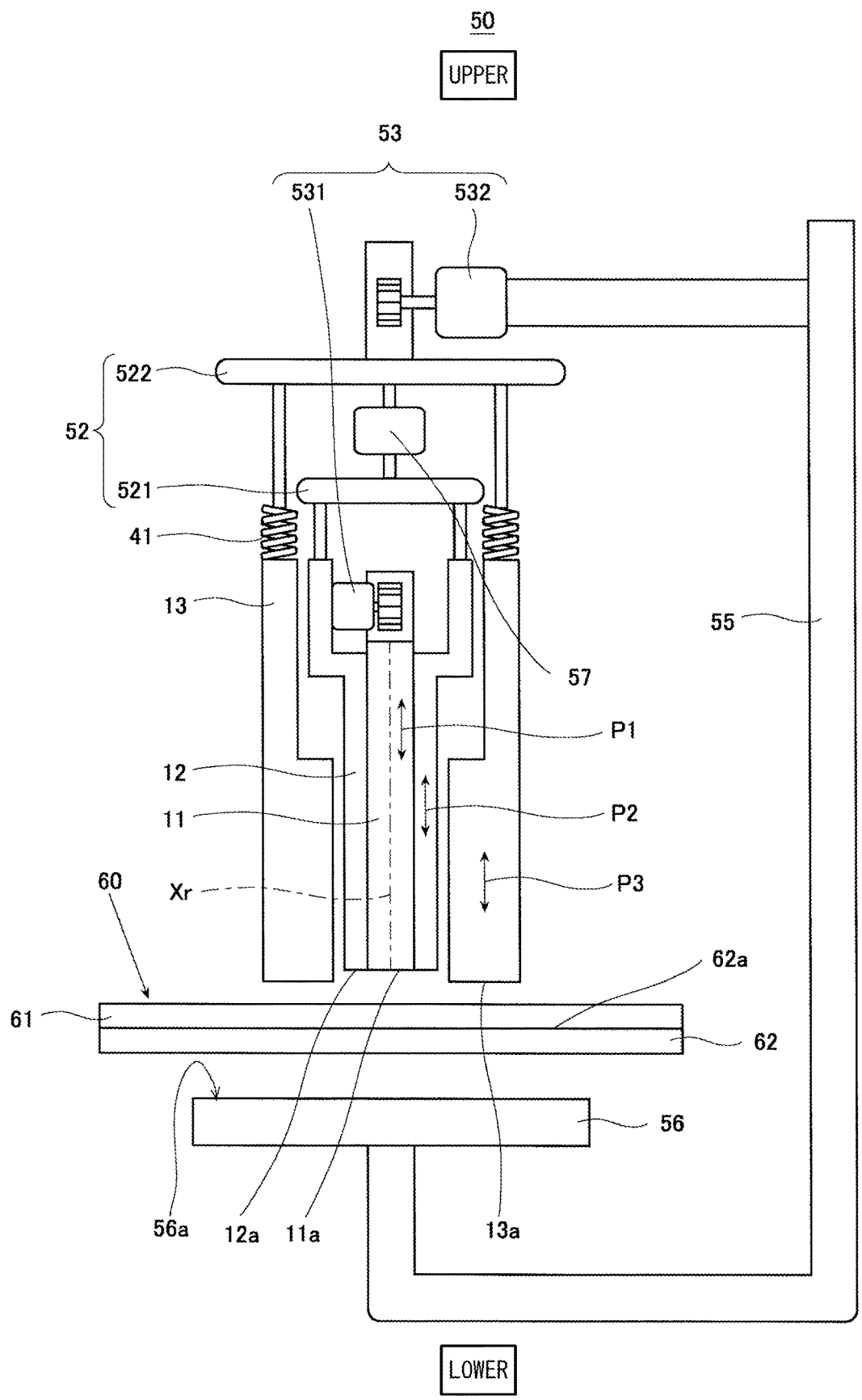
FIG. 1 is a schematic diagram showing a schematic configuration of a friction stir spot welder according to Embodiment 1.

Hereinafter, preferred embodiments will be described with reference to the drawings. In the following description and the drawings, the same reference signs are used for the same or corresponding components, and the repetition of the same explanation is avoided. Moreover, in the drawings, components necessary to explain the embodiments are shown, and the other components may be omitted. Furthermore, the scope disclosed in the present specification is not limited to the following embodiments.

Embodiment 1

A friction stir spot welder according to Embodiment 1 is a friction stir spot welder that softens a workpiece including a first workpiece and a second workpiece by frictional heat to weld the workpiece. The friction stir spot welder includes: a pin that is columnar; a shoulder that is cylindrical, the pin being within the shoulder; a rotary driver that rotates the pin and the shoulder about an axis that coincides with a center axis of the pin; an advance-retract driver that advances and retracts the pin and the shoulder along the axis; and circuitry. The first workpiece is located so as to be opposed to the pin and the shoulder and includes a material that is lower in melting point than a material of the second workpiece.

The circuitry operates the rotary driver and the advance-retract driver such that the pin and the shoulder press a welded portion of the workpiece while rotating.

The circuitry operates the rotary driver and the advance-retract driver such that the pin and the shoulder stir the workpiece.

When a preset and predetermined first period of time has elapsed in a state where a speed of the rotating shoulder in an axial direction or a speed of the rotating pin in the axial direction is a preset and predetermined first speed, the circuitry determines that a tip of the shoulder or a tip of the pin has reached a contact surface of the second workpiece which is in contact with the first workpiece.

Moreover, in the friction stir spot welder according to Embodiment 1, when the preset and predetermined first period of time has elapsed in a state where the speed of the rotating shoulder in the axial direction is the preset and predetermined first speed, the circuitry may determine that the tip of the shoulder has reached the contact surface of the second workpiece which is in contact with the first workpiece.

Herein, the first speed in a state where the speed of the rotating shoulder in the axial direction is the preset and predetermined first speed denotes a speed range. In other words, a state where the speed of the rotating shoulder in the axial direction is the preset and predetermined first speed denotes a state where the speed of the shoulder in the axial direction falls within a speed range corresponding to the first speed. In the friction stir spot welder according to Embodiment 1, the first speed may be −0.5 mm/second or more and +0.5 mm/second or less.

Moreover, in the friction stir spot welder according to Embodiment 1, the first period of time may be 0.01 second or more and 0.5 second or less.

Moreover, in the friction stir spot welder according to Embodiment 1, after the circuitry determines that the tip of the shoulder has reached the contact surface of the second workpiece which is in contact with the first workpiece, the circuitry may operate the advance-retract driver and the rotary driver such that the tip of the shoulder reaches a preset and predetermined first position in the second workpiece.

Furthermore, in the friction stir spot welder according to Embodiment 1, the first position may be a position away by 0.3 mm or less from the contact surface of the second workpiece which is in contact with the first workpiece.

A method of operating a friction stir spot welder according to Embodiment 1 is a method of operating a friction stir spot welder that softens a workpiece including a first workpiece and a second workpiece by frictional heat to weld the workpiece. The friction stir spot welder includes: a pin that is columnar; a shoulder that is cylindrical, the pin being within the shoulder; a rotary driver that rotates the pin and the shoulder about an axis that coincides with a center axis of the pin; an advance-retract driver that advances and retracts the pin and the shoulder along the axis; and circuitry. The first workpiece is located so as to be opposed to the pin and the shoulder and includes a material that is lower in melting point than a material of the second workpiece.

The method includes:
operating by the circuitry the rotary driver and the advance-retract driver such that the pin and the shoulder press a welded portion of the workpiece while rotating;
operating by the circuitry the rotary driver and the advance-retract driver such that the pin and the shoulder stir the workpiece; and
when a preset and predetermined first period of time has elapsed in a state where a speed of the rotating shoulder in an axial direction or a speed of the rotating pin in the axial direction is a preset and predetermined first speed, determining by the circuitry that a tip of the shoulder or a tip of the pin has reached a contact surface of the second workpiece which is in contact with the first workpiece.

Moreover, in the method of operating the friction stir spot welder according to Embodiment 1, when the preset and predetermined first period of time has elapsed in a state where the speed of the rotating shoulder in the axial direction is the preset and predetermined first speed, the circuitry may determine that the tip of the shoulder has reached the contact surface of the second workpiece which is in contact with the first workpiece.

Moreover, in the method of operating the friction stir spot welder according to Embodiment 1, the first speed may be −0.5 mm/second or more and +0.5 mm/second or less.

Moreover, in the method of operating the friction stir spot welder according to Embodiment 1, the first period of time may be 0.01 second or more and 0.5 second or less.

Moreover, in the method of operating the friction stir spot welder according to Embodiment 1, after the circuitry determines that the tip of the shoulder has reached the contact surface of the second workpiece which is in contact with the first workpiece, the circuitry may operate the advance-retract driver and the rotary driver such that the tip of the shoulder reaches a preset and predetermined first position in the second workpiece.

Furthermore, in the method of operating the friction stir spot welder according to Embodiment 1, the first position may be a position away by 0.3 mm or less from the contact surface of the second workpiece which is in contact with the first workpiece.

Hereinafter, one example of the friction stir spot welder according to Embodiment 1 will be described in detail with reference to the drawings.

Configuration of Friction Stir Spot Welder

FIG. 1 is a schematic diagram showing a schematic configuration of a friction stir spot welder 50 according to Embodiment 1. An upper-lower direction in FIG. 1 is shown as an upper-lower direction of the friction stir spot welder 50.

As shown in FIG. 1, the friction stir spot welder 50 according to Embodiment 1 includes a pin 11, a shoulder 12, a tool fixture 52, an advance-retract driver 53, a clamp structure 13, a backing support 55, a backing structure 56, and a rotary driver 57.

The pin 11, the shoulder 12, the tool fixture 52, the advance-retract driver 53, the clamp structure 13, and the rotary driver 57 are located at an upper end of the backing support 55 including a C-shaped gun (C-shaped frame). Moreover, the backing structure 56 is located at a lower end of the backing support 55. The pin 11, the shoulder 12, the clamp structure 13, and the backing structure 56 are attached to the backing support 55 such that the pin 11, the shoulder 12, and the clamp structure 13 are opposed to the backing structure 56. A workpiece 60 is located between the pin 11 and the backing structure 56, between the shoulder 12 and the backing structure 56, and between the clamp structure 13 and the backing structure 56.

The pin 11, the shoulder 12, and the clamp structure 13 are fixed to the tool fixture 52 including a rotary tool fixture 521 and a clamp fixture 522. Specifically, the pin 11 and the shoulder 12 are fixed to the rotary tool fixture 521, and the clamp structure 13 is fixed to the clamp fixture 522 through a clamp driver 41. The rotary tool fixture 521 is supported by the clamp fixture 522 through the rotary driver 57. The clamp driver 41 includes springs.

Moreover, the pin 11, the shoulder 12, and the clamp structure 13 are driven by the advance-retract driver 53 including a pin driver 531 and a shoulder driver 532, to advance and retract in the upper-lower direction.

The pin 11 has a columnar shape. Although not shown in FIG. 1 in detail, the pin 11 is supported by the rotary tool fixture 521. Moreover, the pin 11 is rotated by the rotary driver 57 about an axis Xr (rotation axis) that coincides with a center axis of the pin 11. Furthermore, the pin 11 can advance and retract by the pin driver 531 in a direction indicated by an arrow P1, i.e., in a direction along the axis Xr (in the upper-lower direction in FIG. 1).

The pin driver 531 may include, for example, a linear motion actuator. Examples of the linear motion actuator include, a servomotor and a rack-and-pinion structure; a servomotor and a ball screw; and an air cylinder.

The shoulder 12 has a cylindrical shape including a hollow and is supported by the rotary tool fixture 521. The pin 11 is located in the hollow of the shoulder 12. In other words, the shoulder 12 is located so as to surround an outer peripheral surface of the pin 11.

Moreover, the shoulder 12 is rotated by the rotary driver 57 about the same axis Xr as the pin 11. Furthermore, the shoulder 12 can advance and retract by the shoulder driver 532 in a direction indicated by an arrow P2, i.e., in the direction along the axis Xr.

The shoulder driver 532 may include, for example, a linear motion actuator. Examples of the linear motion actuator include: a servomotor and a rack-and-pinion structure; a servomotor and a ball screw; and an air cylinder.

As above, in the present embodiment, the pin 11 and the shoulder 12 (rotary tool) are supported by the rotary tool fixture 521 and are integrally rotated by the rotary driver 57 about the axis Xr. Moreover, the pin 11 can advance and retract by the pin driver 531 in the direction along the axis Xr, and the shoulder 12 can advance and retract by the shoulder driver 532 in the direction along the axis Xr.

In Embodiment 1, the pin 11 can independently advance and retract, and in addition, can advance and retract in accordance with the advancing and retracting of the shoulder 12. However, the pin 1 and the shoulder 12 may individually advance and retract.

As with the shoulder 12, the clamp structure 13 has a cylindrical shape including a hollow. The clamp structure 13 is located such that a center axis of the clamp structure 13 coincides with the axis Xr. The shoulder 12 is in the hollow of the clamp structure 13.

To be specific, the cylindrical shoulder 12 is located so as to surround the outer peripheral surface of the pin 11, and the cylindrical clamp structure 13 is located so as to surround an outer peripheral surface of the shoulder 12. In other words, the clamp structure 13, the shoulder 12, and the pin 11 constitute a coaxial nested structure.

Moreover, the clamp structure 13 presses one surface (front surface 60c) of the workpiece 60. As described above, in Embodiment 1, the clamp structure 13 is supported by the clamp fixture 522 through the clamp driver 41. The clamp driver 41 biases the clamp structure 13 toward the backing structure 56. Then, the clamp structure 13 (and the clamp driver 41 and the clamp fixture 522) can advance and retract by the shoulder driver 532 in a direction indicated by an arrow P3 (which is the same as the direction indicated by the arrow P2 and the direction indicted by the arrow P1).

In Embodiment 1, the clamp driver 41 includes springs. However, the present embodiment is not limited to this. The clamp driver 41 may apply biasing force or pressure to the clamp structure 13. For example, a structure that utilizes gas pressure, hydraulic pressure, a servomotor, or the like may be suitably used.

The pin 11, the shoulder 12, and the clamp structure 13 respectively include a tip surface 11a, a tip surface 12a, and a tip surface 13a. Moreover, the pin 11, the shoulder 12, and the clamp structure 13 advance and retract by the advance-retract driver 53 to bring the tip surface 11a, the tip surface 12a, and the tip surface 13a into contact with the front surface 60c of the workpiece 60 (a welded portion of the workpiece 60) and press the workpiece 60.

In Embodiment 1, the backing structure 56 supports the workpiece 60 having a flat plate shape such that a flat surface (supporting surface 56a) of the backing structure 56 contacts a back surface of the workpiece 60. The configuration of the backing structure 56 is not especially limited as long as the backing structure 56 can appropriately support the workpiece 60 such that the friction stir spot welding can be performed. For example, the backing structures 56 of various shapes may be additionally prepared, and the backing structure 56 may be detachable from the backing support 55 and replaceable in accordance with the types of the workpieces 60.

The workpiece 60 includes two workpieces that are a plate-shaped first workpiece 61 and a plate-shaped second workpiece 62. The first workpiece 61 is located so as to be opposed to the pin 11 and the shoulder 12 and includes a material that is lower in melting point than a material of the second workpiece 62.

A sealant material may be applied to a contact portion between the first workpiece 61 and the second workpiece 62 that are laminated in the workpiece 60. The sealant material may be a sealing material or an adhesive. Examples of the sealant material include: synthetic rubber, such as polysulfide synthetic rubber, natural rubber, silicone rubber, and fluorocarbon rubber; and synthetic resin, such as ethylene tetrafluoride rubber resin.

The first workpiece 61 may include at least one of a metal material (such as aluminum, aluminum alloy, or magnesium alloy); thermoplastic (such as polyamide); and fiber reinforced plastic (such as carbon fiber reinforced plastic). As the aluminum alloy, various aluminum alloys may be used. For example, Al—Mg—Si alloy (A6061) may be used, or Al—Si—Mg alloy (AC4C) may be used.

Moreover, the second workpiece 62 may include a metal material (such as steel, titanium, stainless steel, or copper). As the steel, various steels may be used. Soft steel or high tensile steel may be used. Moreover, an oxide film may be formed on the surface of the steel. Or, a plating layer (such as zinc plating) may be formed on the surface of the steel. A steel plate on which zinc plating is formed may be a molten zinc plated steel plate (GI steel plate), an alloyed molten zinc plated steel plate (GA steel plate), a Galvalume steel plate (trademark), or an aluminum silicon plated hot stamp steel plate. Furthermore, the thickness of the plating layer may be 2 to 50 μm.

Embodiment 1 adopts a case where the workpiece 60 includes the plate-shaped first workpiece 61 and the plate-shaped second workpiece 62. However, the present embodiment is not limited to this. The shape of the workpiece 60 (the shape of the first workpiece 61 and the shape of the second workpiece 62) may be any shape and may be, for example, a rectangular solid shape or a circular-arc shape. Moreover, the workpiece 60 may include three or more workpieces.

Moreover, specific configurations of the pin 11, the shoulder 12, the tool fixture 52, the advance-retract driver 53, the clamp structure 13, the backing support 55, and the rotary driver 57 in Embodiment 1 are not limited to the above-described configurations, and configurations widely known in the field of the friction stir welding may be suitably used. For example, each of the pin driver 531 and the shoulder driver 532 may include a motor, a gear mechanism, and the like known in the field of the friction stir welding.

Moreover, in Embodiment 1, the backing support 55 includes the C-shaped gun but is not limited to this. The backing support 55 may have any configuration as long as: the backing support 55 can support the pin 11, the shoulder 12, and the clamp structure 13 such that the pin 11, the shoulder 12, and the clamp structure 13 can advance and retract; and the backing support 55 can support the backing structure 56 at a position opposed to the pin 11, the shoulder 12, and the clamp structure 13.

Moreover, Embodiment 1 adopts a case where the clamp structure 13 is included. However, the present embodiment is not limited to this and may adopt a case where the clamp structure 13 is not included. In this case, for example, the clamp structure 13 may be detachable from the backing support 55 according to need.

Furthermore, the friction stir spot welder 50 according to Embodiment 1 is located at a friction stir spot welding robot system (not shown). Specifically, the backing support 55 is attached to a tip of an arm of the robot system.

Therefore, the backing support 55 can be regarded as being included in the friction stir spot welding robot system. A specific configuration of the friction stir spot welding robot system including the backing support 55 and the arm is not especially limited, and apparatuses, such as an articulated robot, known in the field of the friction stir welding can be suitably used.

The present embodiment is not limited to a case where the friction stir spot welder 50 (including the backing support 55) is applied to the friction stir spot welding robot system. The friction stir spot welder 50 (including the backing support 55) is suitably applicable to known processing apparatuses, such as NC machining apparatuses, large C-shaped frames, and automatic riveters.

Moreover, the friction stir spot welder 50 according to Embodiment 1 may be configured such that two or more robots make the backing structure 56 and portions of the friction stir spot welder 50 other than the backing structure 56 face each other. Furthermore, as long as the friction stir spot welder 50 can stably perform the friction stir spot welding with respect to the workpiece 60, the workpiece 60 may be of a handy type, or a robot may be used as a positioner for the workpiece 60.

Control Configuration of Friction Stir Spot Welder

Next, a control configuration of the friction stir spot welder 50 according to Embodiment 1 will be specifically described with reference to FIG. 2.

Figure 2:
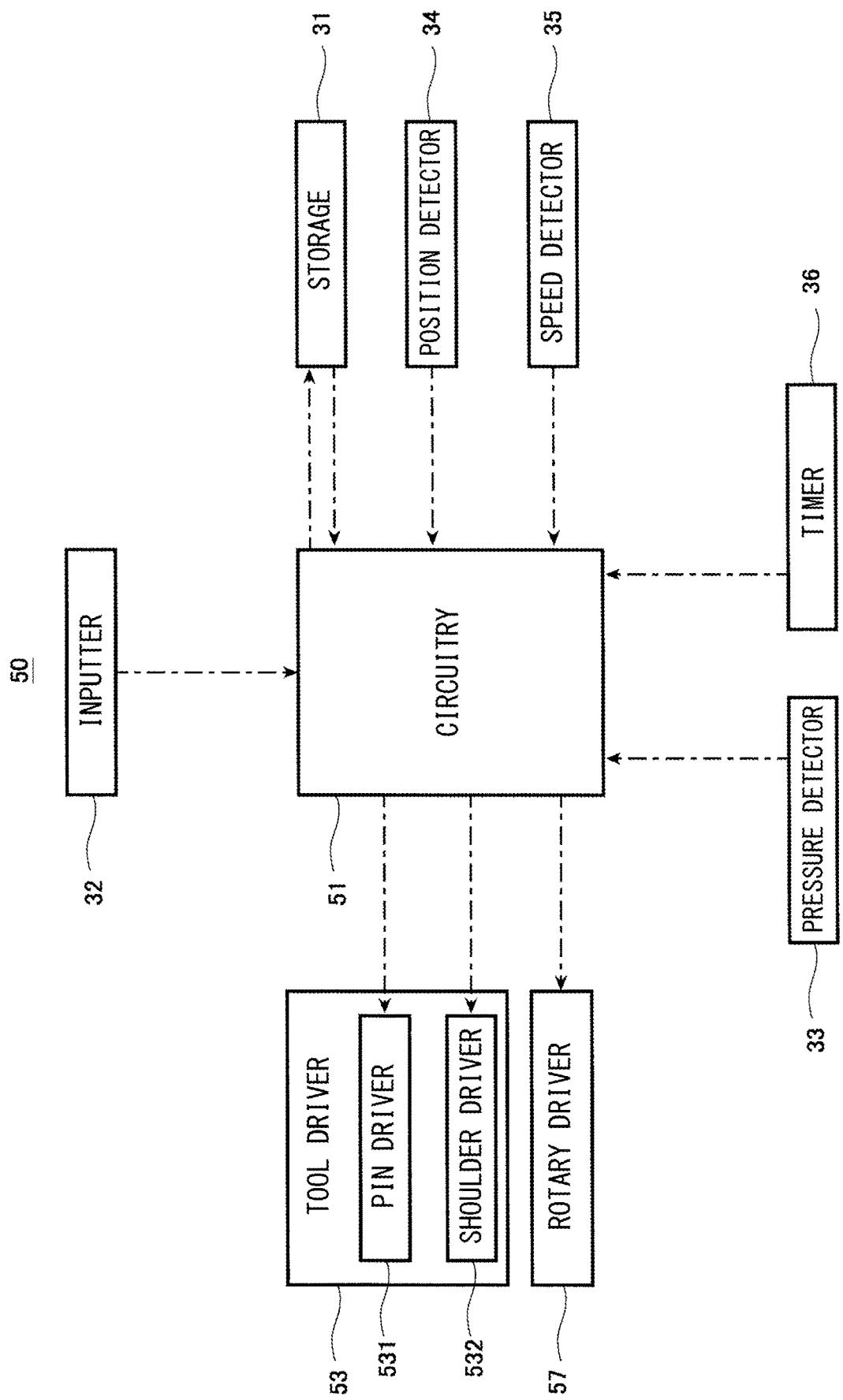
FIG. 2 is a block diagram schematically showing a control configuration of the friction stir spot welder shown in FIG. 1.

FIG. 2 is a block diagram schematically showing the control configuration of the friction stir spot welder 50 shown in FIG. 1.

As shown in FIG. 2, the friction stir spot welder 50 includes circuitry 51, a storage 31, an inputter 32, a pressure detector 33, a position detector 34, a speed detector 35, and a timer 36.

The circuitry 51 controls respective structures (respective devices) included in the friction stir spot welder 50. Specifically, the circuitry 51 reads and executes software, such as a basic program, stored in the storage 31 to control the pin driver 531 and the shoulder driver 532 included in the advance-retract driver 53 and the rotary driver 57.

With this, switching between advancing and retracting of the pin 11 and the shoulder 12, control of the positions of a tip of the pin 11 and a tip of the shoulder 12 during advancing or retracting, movement speeds of the pin 11 and the shoulder 12, movement directions of the pin 11 and the shoulder 12, and the like can be controlled. Moreover, pressing forces applied to the workpiece 60 from the pin 11, the shoulder 12, and the clamp structure 13 can be controlled. Furthermore, rotational frequencies of the pin 11 and the shoulder 12 can be controlled.

The circuitry 51 may include a single circuitry 51 which performs centralized control or may include circuitries 51 which cooperate to perform distributed control. Moreover, the circuitry 51 may include a microcomputer or may include an MPU, a PLC (Programmable Logic Controller), a logic circuit, or the like.

The storage 31 stores a basic program and various data such that the basic program and various data are readable. The storage 31 includes a known memory, a storage such as a hard disk, or the like. The storage 31 does not have to be a single storage and may include storages (for example, a random access memory and a hard disc drive). When the circuitry 51 and the like are included in a microcomputer, at least part of the storage 31 may be an internal memory of the microcomputer or may be an independent memory.

Needless to say, the storage 31 stores data, and the data may be read by a device other than the circuitry 51, and the circuitry 51 and the like may write data in the storage 31.

The inputter 32 inputs, to the circuitry 51, various parameters regarding the control of the friction stir spot welding, other data, and the like. The inputter 32 includes a known input device, such as a keyboard, a touch panel, or a button switch group. In Embodiment 1, at least data of welding conditions of the workpiece 60, such as the thickness, material, and the like of the workpiece 60, can be input by the inputter 32.

The pressure detector 33 detects pressure (pressing force) applied to the workpiece 60 by the pin 11 or the shoulder 12 when the pin 11 or the shoulder 12 contacts or presses the workpiece 60. Then, the pressure detector 33 outputs the detected pressing force to the circuitry 51. In Embodiment 1, a load cell is used as the pressure detector 33. However, the pressure detector 33 is not limited to this, and a known pressure detector may be used.

The position detector 34 detects positional information of the tip (tip surface 12a) of the shoulder 12 and outputs the detected positional information to the circuitry 51. A displacement sensor, a LVDT, an encoder, or the like may be used as the position detector 34. When an encoder is used as the position detector 34, the encoder may detect a rotation angle of the advance-retract driver 53 (shoulder driver 532) that advances or retracts the shoulder 12. Moreover, the position detector 34 may be an ammeter that detects a current value supplied to the advance-retract driver 53 (shoulder driver 532) that advances or retracts the shoulder 12.

The speed detector 35 detects the speed of the shoulder 12 in the axial direction and outputs the detected speed information to the circuitry 51. For example, as the speed detector 35, an encoder that detects the rotation angle of the advance-retract driver 53 (shoulder driver 532) that advances or retracts the shoulder 12 may be used.

The timer 36 includes a clock function and/or a calendar function. Moreover, the timer 36 performs time measurement and outputs the measured time information to the circuitry 51.

Operation (Operating Method) of Friction Stir Spot Welder

Next, the operation of the friction stir spot welder 50 according to Embodiment 1 will be specifically described with reference to FIGS. 3A to 4B. The following operation is executed in such a manner that the circuitry 51 reads a program stored in the storage 31.

Figure 3A:
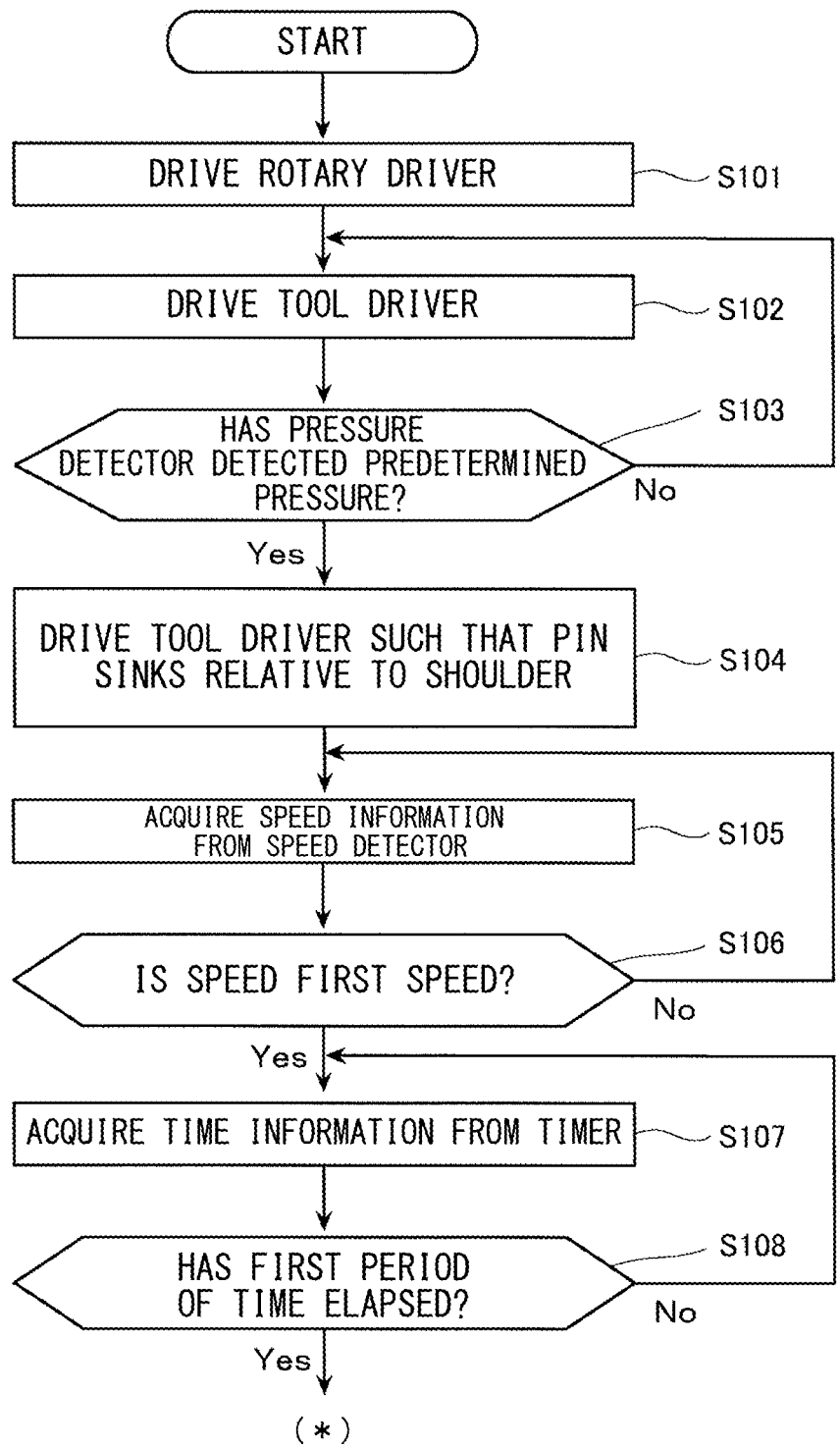
FIG. 3A is a flowchart showing one example of an operation of the friction stir spot welder according to Embodiment 1.
Figure 3B:
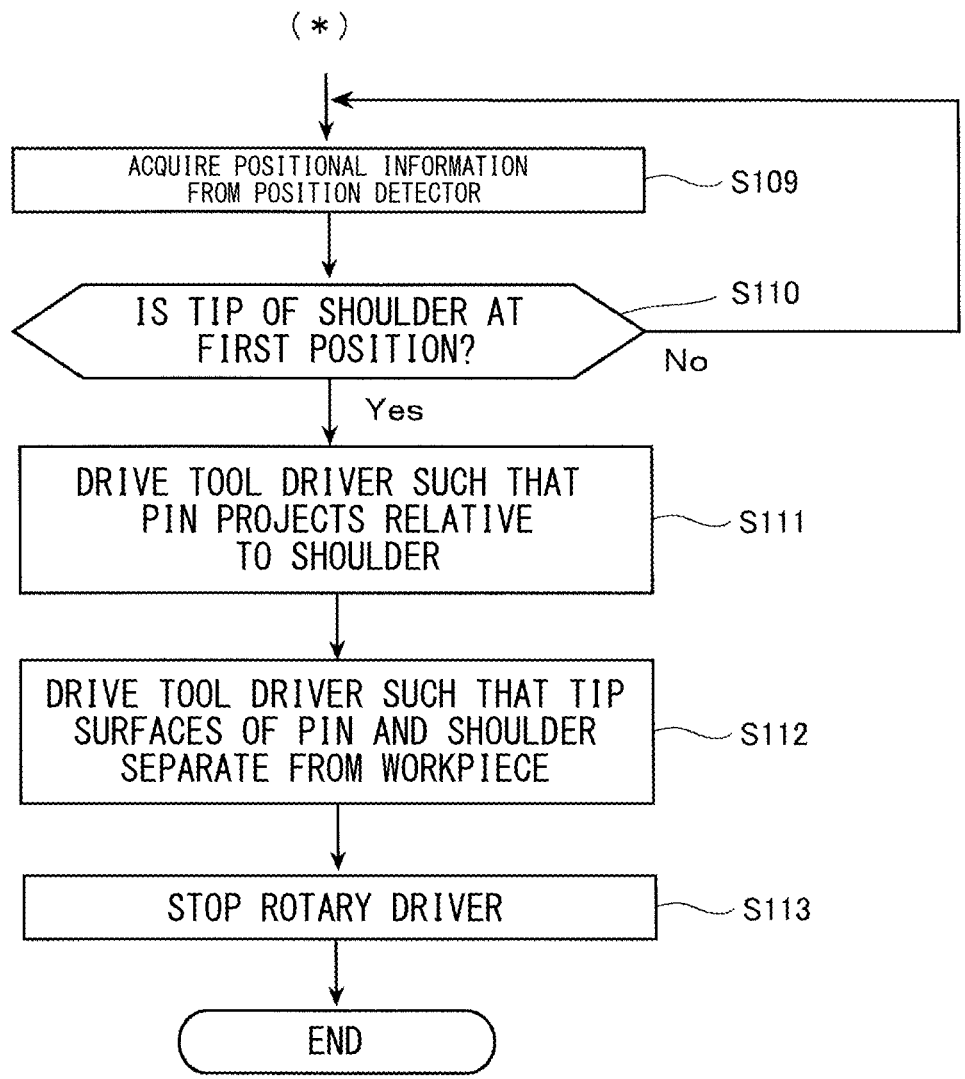
FIG. 3B is a flowchart showing one example of the operation of the friction stir spot welder according to Embodiment 1.
Figure 4A:
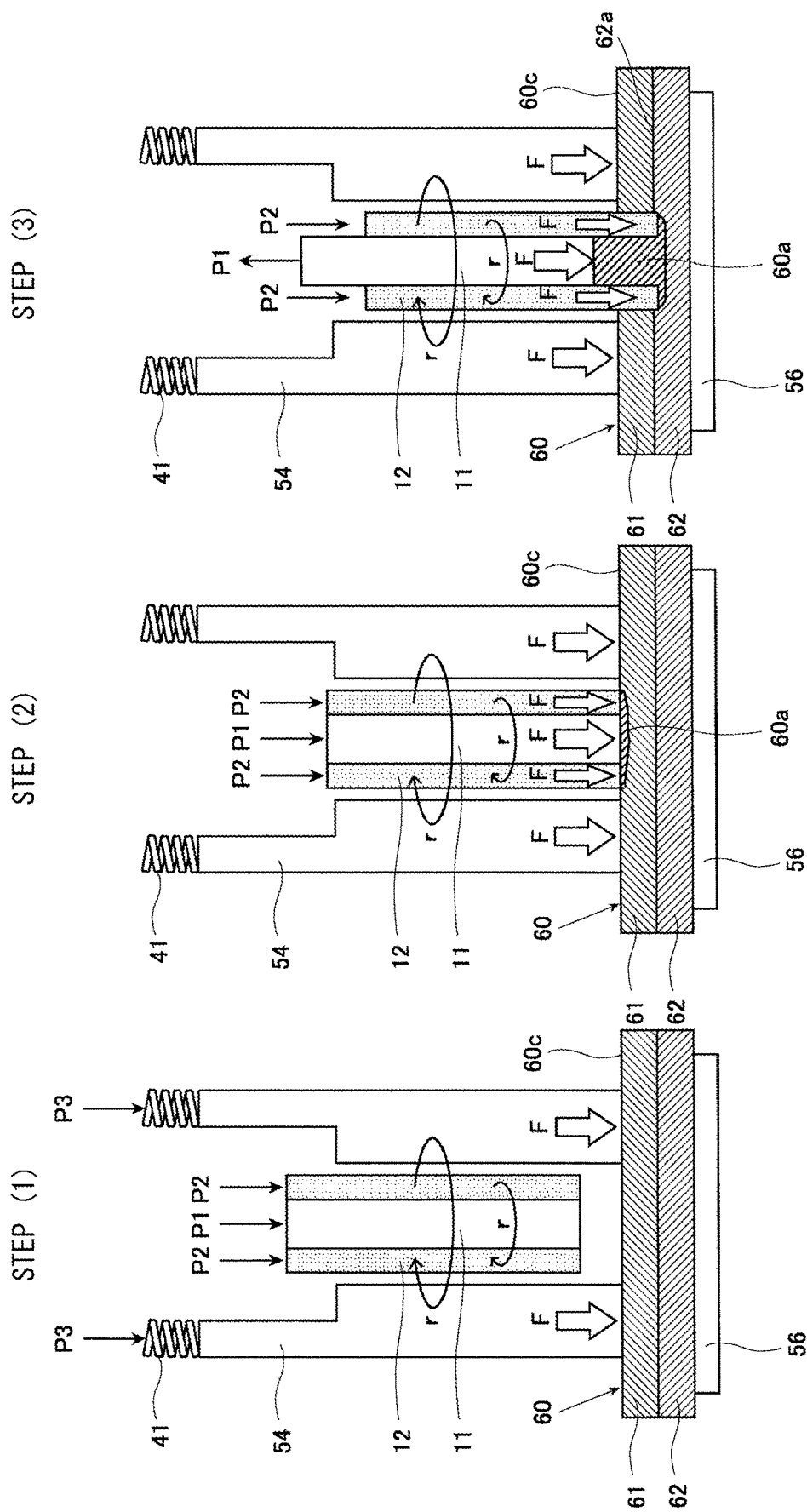
FIG. 4A is a process diagram schematically showing one example of steps of friction stir spot welding performed by the friction stir spot welder shown in FIG. 1.
Figure 4B:
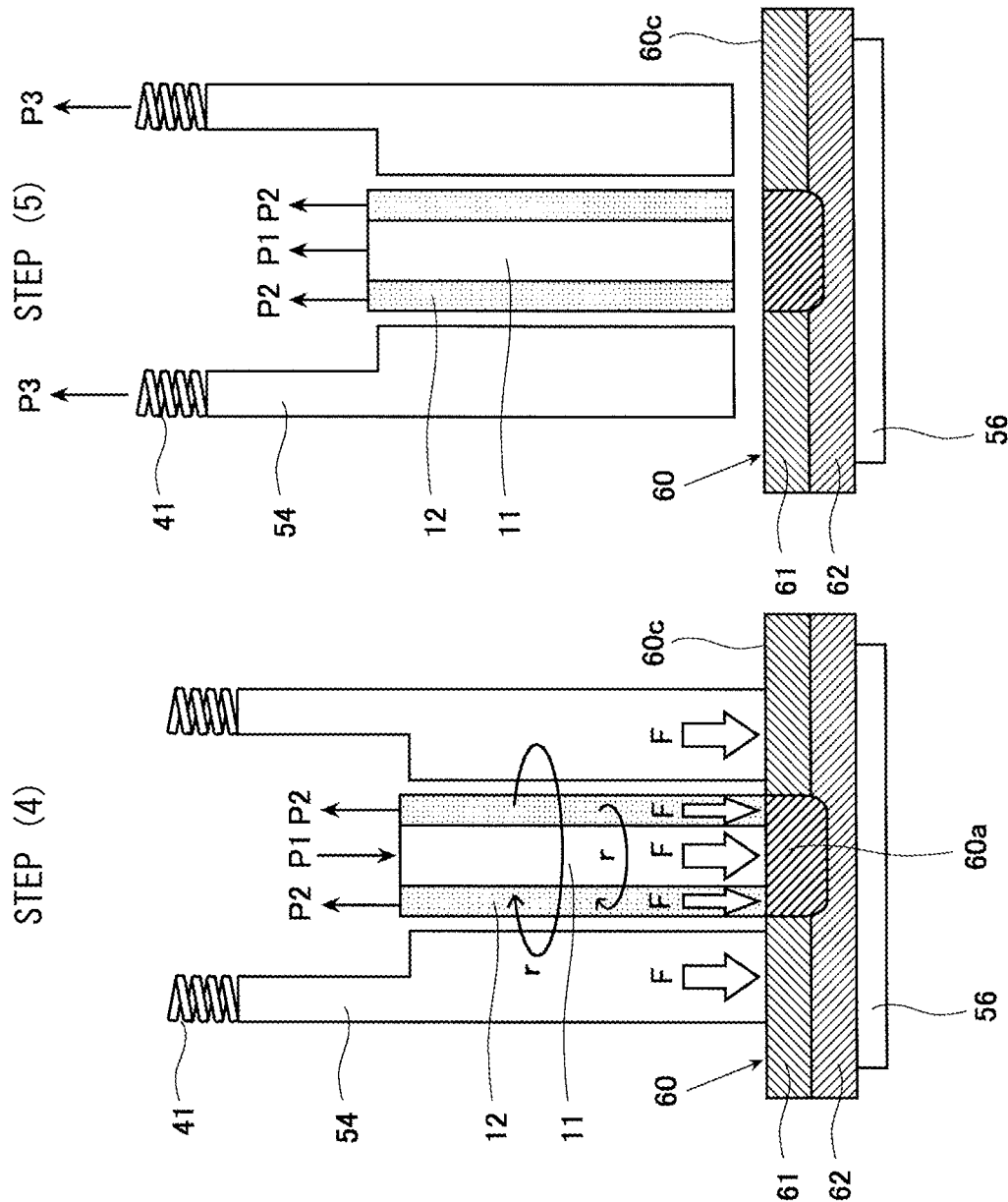
FIG. 4B is a process diagram schematically showing one example of steps of the friction stir spot welding performed by the friction stir spot welder shown in FIG. 1.

FIGS. 3A and 3B are flowcharts showing one example of the operation of the friction stir spot welder 50 according to Embodiment 1. FIGS. 4A and 4B are process diagrams schematically showing one example of steps of the friction stir spot welding performed by the friction stir spot welder 50 shown in FIG. 1.

FIGS. 4A and 4B show an example in which the first workpiece 61 and the second workpiece 62 are used as the workpiece 60 and are laminated on each other and coupled to each other by spot welding. In FIGS. 4A and 4B, part of the friction stir spot welder 50 is not shown. Arrows r indicate the rotational directions of the pin 11 and the shoulder 12, and block arrows F indicate directions of forces applied to the first workpiece 61 and the second workpiece 62.

Moreover, although forces are applied to the first workpiece 61 and the second workpiece 62 also from the backing structure 56, such forces are not shown in FIGS. 4A and 4B for convenience of explanation. Furthermore, in FIGS. 4A and 4B, the shoulder 12 is shown by cross hatching so as to be clearly distinguished from the pin 11 and the clamp structure 13.

First, a worker (operator) places the workpiece 60 on the supporting surface 56a of the backing structure 56. Next, the worker manipulates the inputter 32 to input execution of welding of the workpiece 60 to the circuitry 51. A robot may place the workpiece 60 on the supporting surface 56a of the backing structure 56.

Then, as shown in FIG. 3A, the circuitry 51 drives the rotary driver 57 to rotate the pin 1 and the shoulder 12 at a preset and predetermined first rotational frequency (for example, 200 to 3,000 rpm) (Step S101; see Step (1) in FIG. 4A).

Next, while driving the advance-retract driver 53 (shoulder driver 532) to rotate the pin 11 and the shoulder 12, the circuitry 51 makes the pin 11, the shoulder 12, and the clamp structure 13 approach the workpiece 60 and brings the tip surface 11a of the pin 11, the tip surface 12a of the shoulder 12, and the tip surface 13a of the clamp structure 13 (not shown in FIGS. 4A and 4B) into contact with the front surface 60c (welded portion of the workpiece 60) of the workpiece 60 (Step S102; see Step (2) in FIG. 4A).

At this time, the circuitry 51 controls the advance-retract driver 53 (shoulder driver 532) such that the pin 11, the shoulder 12, and the clamp structure 13 press the workpiece 60 by a preset and predetermined pressing force (for example, a predetermined value within a range of 3 kN to 15 kN).

Therefore, the circuitry 51 determines whether or not the pressure detector 33 has detected predetermined pressure (for example, 3 kN to 15 kN) (Step S103). With this, the circuitry 51 can determine whether or not the tip surface 11a of the pin 11, the tip surface 12a of the shoulder 12, and the tip surface 13a of the clamp structure 13 have contacted the front surface 60c of the workpiece 60.

When the circuitry 51 determines that the pressure detector 33 has not detected the predetermined pressure (No in Step S103), the circuitry 51 repeatedly performs Steps S102 and S103 until the pressure detector 33 detects the predetermined pressure.

On the other hand, when the circuitry 51 determines that the pressure detector 33 has detected the predetermined pressure (Yes in Step S103), the circuitry 51 executes Step S104.

When the tip surface 11a of the pin 11, the tip surface 12a of the shoulder 12, and the tip surface 13a of the clamp structure 13 are brought into contact with the front surface 60c of the workpiece 60, the first workpiece 61 and the second workpiece 62 are sandwiched between the clamp structure 13 and the backing structure 56. Then, the clamp structure 13 is biased toward the front surface 60c of the workpiece 60 by the contraction of the clamp driver 41 to generate clamping force.

Moreover, in this state, since the pin 11 and the shoulder 12 do not advance or retract, the front surface 60c of the workpiece 60 is subjected to "preheating." With this, a constituent material at a contact region of the first workpiece 61 is softened by heat generated by friction, and thus, a plastically flowing portion 60a is generated in the vicinity of the front surface 60c of the workpiece 60.

In Step S104, the circuitry 51 drives the advance-retract driver 53 such that the tip surface 11a of the pin 11 sinks relative to the tip surface 12a of the shoulder 12. At this time, the circuitry 51 may drive the advance-retract driver 53 (pin driver 531) such that the pin 11 separates from the workpiece 60. Moreover, the circuitry 51 may drive the advance-retract driver 53 (shoulder driver 532) such that the shoulder 12 is pressed in the workpiece 60.

With this, the tip portion of the shoulder 12 is pressed in the welded portion of the workpiece 60 while rotating.

Next, the circuitry 51 acquires, from the speed detector 35, the speed information of the shoulder 12 in the axial direction which is detected by the speed detector 35 (Step S105). Next, the circuitry 51 determines whether or not the speed information (speed) acquired in Step S105 is a preset and predetermined first speed (Step S106).

Herein, the first workpiece 61 and the second workpiece 62 are made of different metals, and the second workpiece 62 is made of a material that is higher in melting point (a material that is harder) than the material of the first workpiece 61. Therefore, when the tip (tip surface 12a) of the shoulder 12 reaches a contact surface 62a of the second workpiece 62 which is in contact with the first workpiece 61, the speed of the shoulder 12 in the axial direction decreases.

Therefore, the first speed can be preset based on experiments or the like and is suitably set based on the composition of the second workpiece 62 or the like. From the viewpoint of the detection accuracy of the speed detector 35, the first speed may be −0.5 mm/second or more and +0.5 mm/second or less.

When the circuitry 51 determines that the speed information acquired in Step S105 is not the first speed (No in Step S106), the circuitry 51 returns to Step S105. The circuitry 51 repeatedly performs Steps S105 and S106 until the speed information acquired in Step S105 becomes the first speed.

On the other hand, when the circuitry 51 determines that the speed information acquired in Step S105 is the first speed (Yes in Step S106), the circuitry 51 acquires the time information from the timer 36 (Step S107). Specifically, the circuitry 51 acquires from the timer 36 a time elapsed since the circuitry 51 has determined that the speed information acquired in Step S105 is the first speed.

The circuitry 51 determines whether or not the time information (time elapsed since the circuitry 51 has determined that the speed information acquired in Step S105 is the first speed) acquired in Step S107 is longer than a preset first period of time (Step S108).

Herein, in the friction stir spot welder 50 according to Embodiment 1, the time elapsed since the speed of the shoulder 12 in the axial direction has become the first speed is measured due to the following reasons. To be specific, even when the tip (tip surface 12a) of the shoulder 12 reaches the contact surface 62a of the second workpiece 62 which is in contact with the first workpiece 61, the tip portion of the shoulder 12 is not immediately pressed in the second workpiece 62.

Therefore, misdetection can be avoided by measuring the time elapsed since the speed of the shoulder 12 in the axial direction has become the first speed. Moreover, the circuitry 51 can more clearly (accurately) determine that the tip (tip surface 12a) of the shoulder 12 has reached the contact surface 62a of the second workpiece 62 which is in contact with the first workpiece 61.

The first period of time can be preset based on experiments or the like. When the difference between the melting point (hardness) of the first workpiece 61 and the melting point (hardness) of the second workpiece 62 is small, the first period of time may be, for example, 0.01 second or more, 0.05 second or more, 0.1 second or more, or 0.2 second or more. Moreover, when the difference between the melting point (hardness) of the first workpiece 61 and the melting point (hardness) of the second workpiece 62 is large, the first period of time may be, for example, 0.5 second or less or 0.4 second or less.

When the circuitry 51 determines that the time information acquired in Step S107 is not longer than the first period of time (No in Step S108), the circuitry 51 returns to Step S107. The circuitry 51 repeatedly performs Steps S107 and S108 until the time information acquired in Step S107 becomes longer than the first period of time.

On the other hand, when the circuitry 51 determines that the time information acquired in Step S107 is longer than the first period of time (Yes in Step S108), the circuitry 51 acquires the positional information of the tip of the shoulder 12 from the position detector 34 (Step S109; see FIG. 3B). Then, the circuitry 51 determines whether or not the positional information of the tip of the shoulder 12 which is acquired in Step S109 has reached the preset and predetermined first position (Step S110).

Herein, the first position can be preset based on experiments or the like and is an arbitrary position away by 0.3 mm or less from the contact surface 62a of the second workpiece 62 which is in contact with the first workpiece 61.

To remove the plating layer (plating film) or the oxide film formed on the second workpiece 62 to form a new surface, the first position may be a position away from the contact surface 62a by 0.008 mm or more or 0.01 mm or more. Moreover, to suppress the wear (damage) of the shoulder 12, the first position may be a position away from the contact surface 62a by 0.25 mm or less, 0.20 mm or less, or 0.10 mm or less.

Furthermore, to remove the plating layer (plating film) or the oxide film formed on the second workpiece 62 to form the new surface, the first position may be a position away by 0.20 mm or less or 0.10 mm or less from the plating layer (plating film) or the oxide film formed on the second workpiece 62.

With this, the tip surface 12a of the shoulder 12 reaches the arbitrary position (i.e., the first position) away from the contact surface 62a of the second workpiece 62 by 0.3 mm or less. Then, the new surface is formed at a portion of the second workpiece 62 which is in contact with the shoulder 12 and/or a portion of the second workpiece 62 which is in contact with the plastically flowing portion 60a.

A softened material of the plastically flowing portion 60a is pushed away by the shoulder 12 to flow from a position right under the shoulder 12 to a position right under the pin 11. Therefore, the pin 11 retracts and moves upward relative to the shoulder 12 (see Step (3) in FIG. 4A).

Moreover, impurities (such as zinc and iron oxide) in the plating layer (plating film) or the oxide film formed on the surface of the second workpiece 62 also flow to the position right under the pin 11. Furthermore, some of the above impurities flow outward beyond an outer peripheral surface of the tip portion of the shoulder 12.

When the circuitry 51 determines that the positional information of the tip of the shoulder 12 acquired in Step S109 has not yet reached the first position (No in Step S110), the circuitry 51 returns to Step S109. The circuitry 51 repeatedly performs Steps S109 and S110 until the circuitry 51 determines that the positional information of the tip portion of the shoulder 12 acquired in Step S109 has reached the first position.

On the other hand, when the circuitry 51 determines that the positional information of the tip of the shoulder 12 acquired in Step S109 has reached the first position (Yes in Step S110), the circuitry 51 executes Step S111.

In Step S11, the circuitry 51 drives the advance-retract driver 53 (pin driver 531) such that the pin 11 advances toward the workpiece 60, and/or the circuitry 51 drives the advance-retract driver 53 (shoulder driver 532) such that the shoulder 12 separates from the workpiece 60.

Specifically, the circuitry 51 controls the advance-retract driver 53 such that almost no level difference is generated between the tip surface 11a of the pin 11 and the tip surface 12a of the shoulder 12 (the tip surface 1l a of the pin 11 and the tip surface 12a of the shoulder 12 are flush with each other).

With this, the pin 11 gradually advances toward the first workpiece 61, and the shoulder 12 retracts from the first workpiece 61. At this time, the softened portion of the plastically flowing portion 60a flows from the position right under the pin 11 to the position right under the shoulder 12 (to a recess generated by press-in of the shoulder 12).

Then, the tip surface 11a of the pin 11 and the tip surface 12a of the shoulder 12 move to the vicinity of the front surface 60c of the workpiece 60. With this, the front surface 60c of the workpiece 60 is shaped, and a substantially flat surface where recesses are not practically generated is obtained (see Step (4) in FIG. 4B).

It is preferable that the circuitry 51 control the advance-retract driver 53 in Step S104 and/or Step S111 so as to reduce an absolute value of a tool average position Tx defined by Formula (I) below.

$$Ap \cdot Pp + As \cdot Ps = Tx \tag{I}$$

In Formula (I), Ap denotes the area of the tip surface of the pin 11, As denotes the area of the tip surface of the shoulder 12, Pp denotes a press-in depth of the pin 11, and Ps denotes a press-in depth of the shoulder 12. It is more preferable that the circuitry 51 control the advance-retract driver 53 such that the tool average position Tx becomes zero. Since specific control of reducing the absolute value of the tool average position Tx is disclosed in Japanese Laid-Open Patent Application Publication No. 2012-196682 in detail, an explanation thereof is omitted herein.

Moreover, the circuitry 51 may control the advance-retract driver 53 in Step S111 such that the tip surface 11a of the pin 11 reaches the first position. In this case, after the tip surface 11a of the pin 11 reaches the first position, the circuitry 51 may control the advance-retract driver 53 such that the tip surface 11a of the pin 11 and the tip surface 12a of the shoulder 12 become flush with each other.

Next, the circuitry 51 drives the advance-retract driver 53 such that the pin 11, the shoulder 12, and the clamp structure 13 separate from the workpiece 60 (Step S112). Then, the circuitry 51 controls the rotary driver 57 to stop the rotation of the pin 11 and the shoulder 12 (Step S113; see Step (5) in FIG. 4B) and terminates the present program (step of welding the workpiece 60).

With this, since the rotation (and pressing) of the pin 11 and the shoulder 12 during the contact of the pin 11 and the shoulder 12 with the first workpiece 61 and the second workpiece 62 is not applied to the first workpiece 61 and the second workpiece 62, the plastic flow stops at the plastically flowing portion 60a, and the plastically flowing portion 60a and the new surface of the second workpiece 62 are welded to each other.

In the friction stir spot welder 50 according to Embodiment 1 configured as above, in a state where the speed of the rotating shoulder 12 in the axial direction is the first speed, the circuitry 51 determines whether or not the first period of time has elapsed.

With this, regardless of variations of the thickness of the first workpiece 61, the circuitry 51 can more clearly (more accurately) determine that the tip of the shoulder 12 has reached the contact surface 62a of the second workpiece 62 which is in contact with the first workpiece 61.

Moreover, in the friction stir spot welder 50 according to Embodiment 1, the circuitry 51 operates the advance-retract driver 53 such that the tip of the shoulder 12 reaches the arbitrary position (i.e., the first position) away by 0.3 mm or less from the contact surface 62a of the second workpiece 62 which is in contact with the first workpiece 61.

With this, the plating layer (plating film) or the oxide film formed on the surface (contact surface 62a) of the second workpiece 62 is removed by the tip portion of the shoulder 12, and the new surface is formed.

Moreover, the impurities (such as zinc) forming the removed plating layer (plating film) or the removed oxide film flow to the position right under the pin 11. Furthermore, some of the impurities flow outward beyond the outer peripheral surface of the tip portion of the shoulder 12.

Therefore, when the softened portion of the plastically flowing portion 60a flows from the position right under the pin 11 to the position right under the shoulder 12 (to the recess generated by press-in of the shoulder 12), the amount of impurities flowing to the position right under the shoulder 12 decreases by the amount of impurities having flowed outward.

In the friction stir spot welder 50 according to Embodiment 1, after the circuitry 51 determines that the first period of time has elapsed in a state where the speed of the rotating shoulder 12 in the axial direction is the first speed, the circuitry 51 operates the advance-retract driver 53 such that the tip of the shoulder 12 reaches the first position. However, the present embodiment is not limited to this.

After the circuitry 51 determines that the first period of time has elapsed in a state where the speed of the rotating shoulder 12 in the axial direction is the first speed, the circuitry 51 may make the movement of the shoulder 12 stand by until a predetermined second period of time further elapses. Moreover, after the circuitry 51 determines that the second period of time has elapsed, the circuitry 51 may drive the advance-retract driver 53 (pin driver 531) such that the pin 11 moves toward the workpiece 60, and/or the circuitry 51 may drive the advance-retract driver 53 (shoulder driver 532) such that the shoulder 12 separates from the workpiece 60.

Herein, to form the new surface on the surface of the second workpiece 62, the second period of time may be 0.1 second or more or 0.2 second or more. Moreover, to prevent excessive heat from being applied to the new surface formed on the surface of the second workpiece 62, the second period of time may be 0.8 second or less or 0.75 second or less.

Embodiment 2

A friction stir spot welder according to Embodiment 2 is configured such that in the friction stir spot welder according to Embodiment 1, when the preset and predetermined first period of time has elapsed in a state where the speed of the rotating pin in the axial direction is the preset and predetermined first speed, the circuitry determines that the tip of the pin has reached the contact surface of the second workpiece which is in contact with the first workpiece.

Moreover, in the friction stir spot welder according to Embodiment 2, the first speed may be −0.5 mm/second or more and +0.5 mm/second or less.

Moreover, in the friction stir spot welder according to Embodiment 2, the first period of time may be 0.01 second or more and 0.5 second or less.

Moreover, in the friction stir spot welder according to Embodiment 2, after the circuitry determines that the tip of the pin has reached the contact surface of the second workpiece which is in contact with the first workpiece, the circuitry may operate the advance-retract driver and the rotary driver such that the tip of the pin reaches the preset and predetermined first position in the second workpiece.

Furthermore, in the friction stir spot welder according to Embodiment 2, the first position may be a position away by 0.3 mm or less from the contact surface of the second workpiece which is in contact with the first workpiece.

A method of operating the friction stir spot welder according to Embodiment 2 is configured such that in the method of operating the friction stir spot welder according to Embodiment 1, when the preset and predetermined first period of time has elapsed in a state where the speed of the rotating pin in the axial direction is the preset and predetermined first speed, the circuitry determines that the tip of the pin has reached the contact surface of the second workpiece which is in contact with the first workpiece.

Moreover, in the method of operating the friction stir spot welder according to Embodiment 2, the first speed may be −0.5 mm/second or more and +0.5 mm/second or less.

Moreover, in the method of operating the friction stir spot welder according to Embodiment 2, the first period of time may be 0.01 second or more and 0.5 second or less.

Moreover, in the method of operating the friction stir spot welder according to Embodiment 2, after the circuitry determines that the tip of the pin has reached the contact surface of the second workpiece which is in contact with the first workpiece, the circuitry may operate the advance-retract driver and the rotary driver such that the tip of the pin reaches the preset and predetermined first position in the second workpiece.

Furthermore, in the method of operating the friction stir spot welder according to Embodiment 2, the first position may be a position away by 0.3 mm or less from the contact surface of the second workpiece which is in contact with the first workpiece.

Hereinafter, one example of the friction stir spot welder according to Embodiment 2 will be described in detail with reference to the drawings.

The friction stir spot welder 50 according to Embodiment 2 is the same in basic configuration as the friction stir spot welder 50 according to Embodiment 1, but the position detector 34 and the speed detector 35 are different between Embodiment 1 and Embodiment 2.

Specifically, the position detector 34 detects the positional information of the tip (tip surface 11a) of the pin 11 and outputs the detected positional information to the circuitry 51. A displacement sensor, a LVDT, an encoder, or the like may be used as the position detector 34.

When an encoder is used as the position detector 34, the encoder may detect the rotation angle of the advance-retract driver 53 (pin driver 531) that advances or retracts the pin 11. Moreover, the position detector 34 may be an ammeter that detects a current value supplied to the advance-retract driver 53 (pin driver 531) that advances or retracts the pin 11.

The speed detector 35 detects the speed of the pin 11 in the axial direction and outputs the detected speed information to the circuitry 51. For example, as the speed detector 35, an encoder that detects the rotation angle of the advance-retract driver 53 (pin driver 531) that advances or retracts the pin 11 may be used.

Operation and Operational Advantages of Friction Stir Spot Welder

The operation of the friction stir spot welder 50 according to Embodiment 2 will be specifically described with reference to FIGS. 5A to 6B. The following operation is executed in such a manner that the circuitry 51 reads a program stored in the storage 31.

Figure 5A:
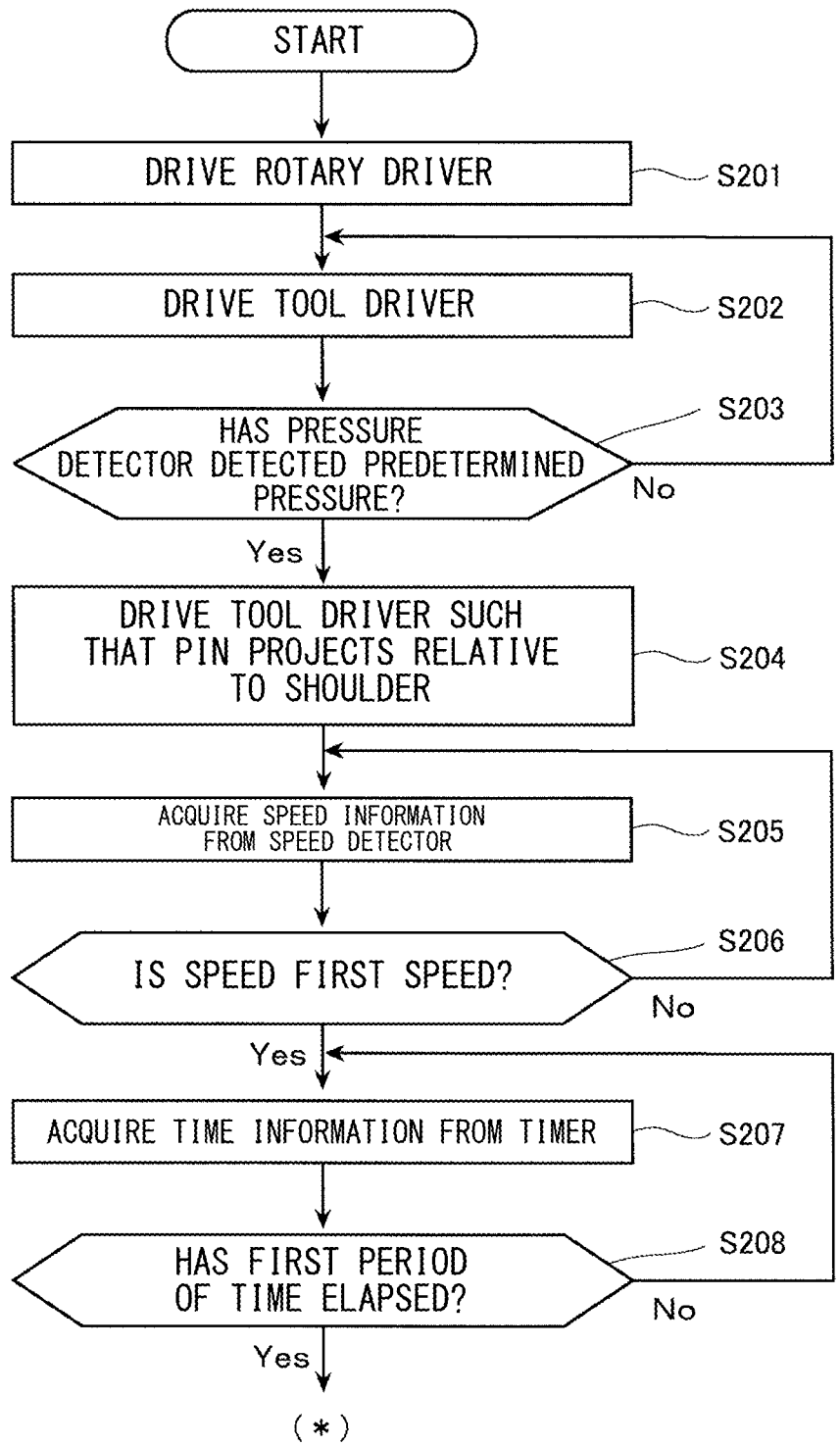
FIG. 5A is a flowchart showing one example of the operation of the friction stir spot welder according to Embodiment 2.
Figure 5B:
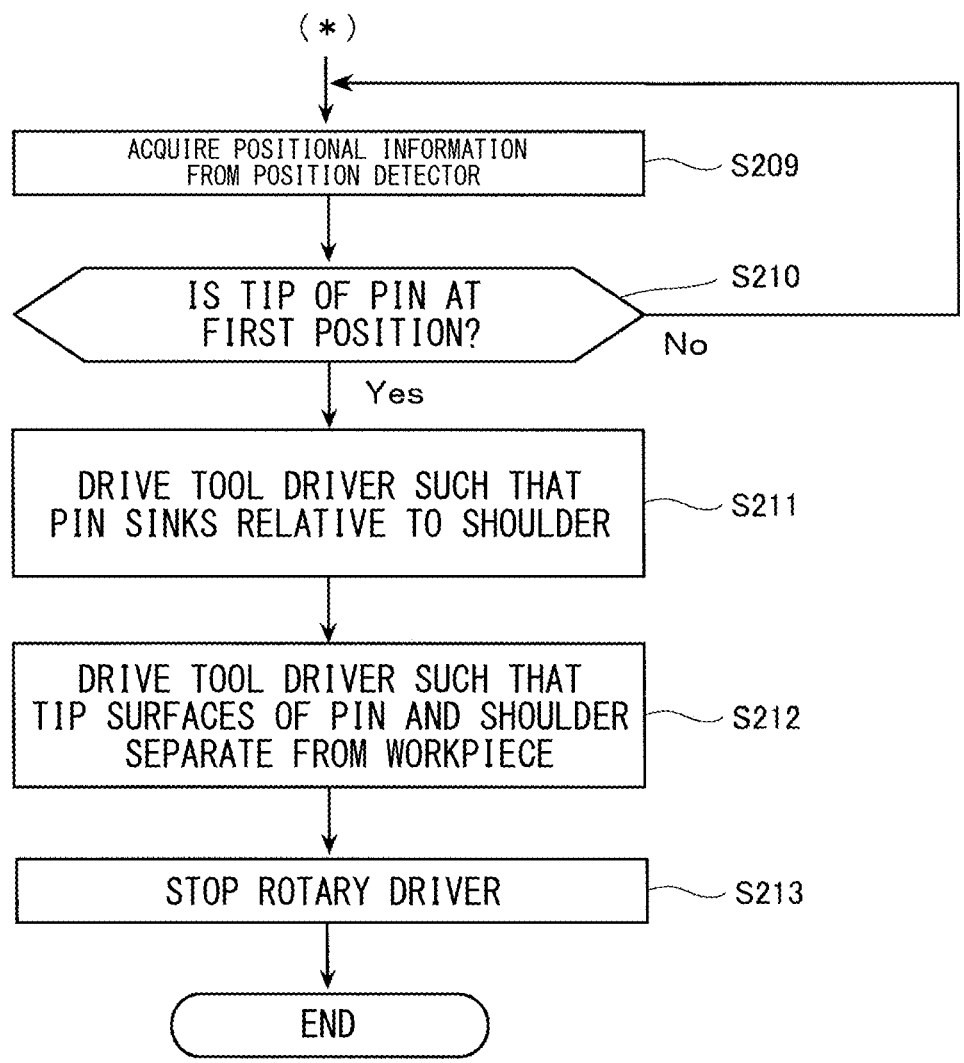
FIG. 5B is a flowchart showing one example of the operation of the friction stir spot welder according to Embodiment 2.
Figure 6A:
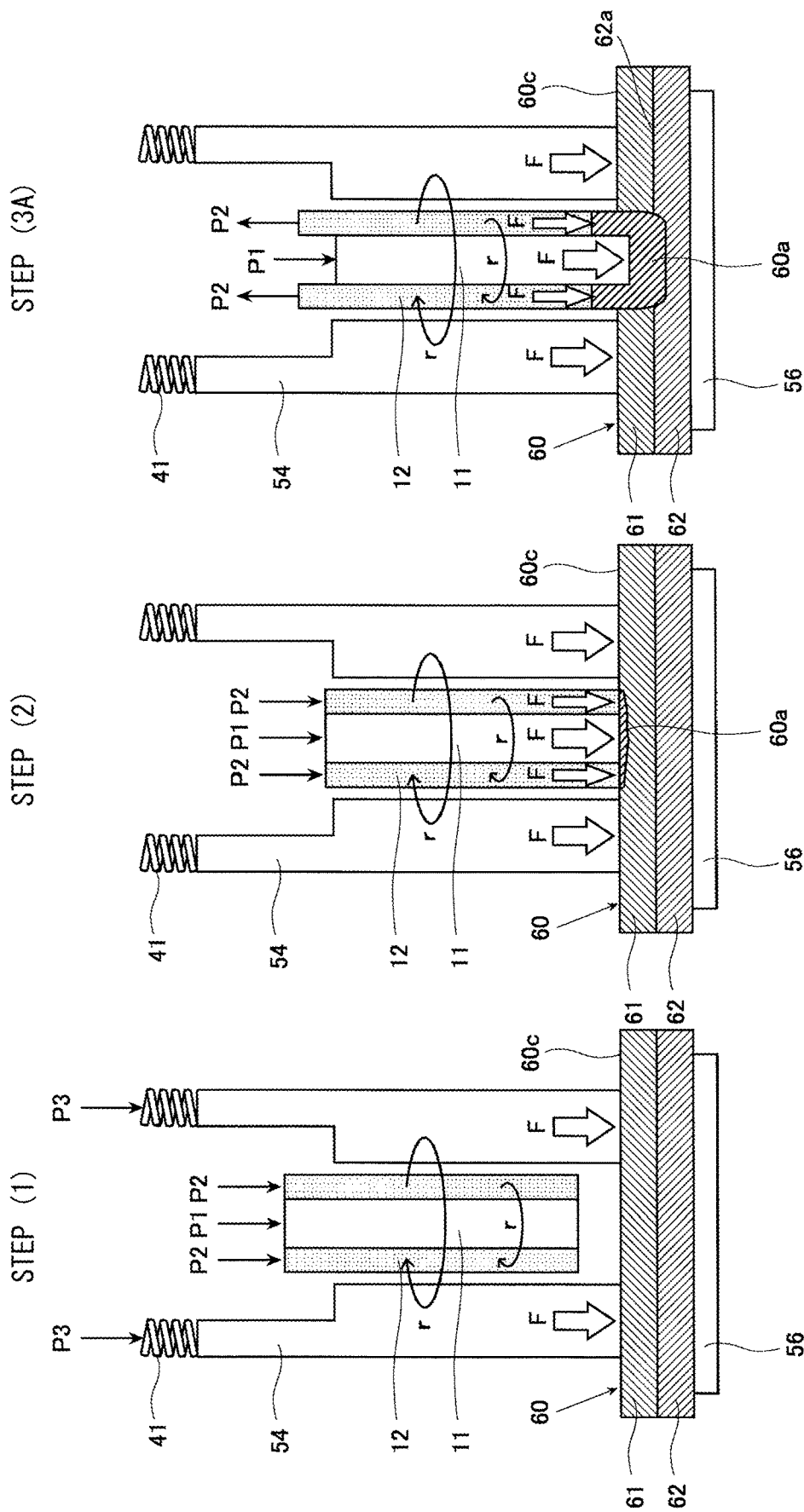
FIG. 6A is a process diagram schematically showing one example of steps of the friction stir spot welding performed by the friction stir spot welder according to Embodiment 2.
Figure 6B:
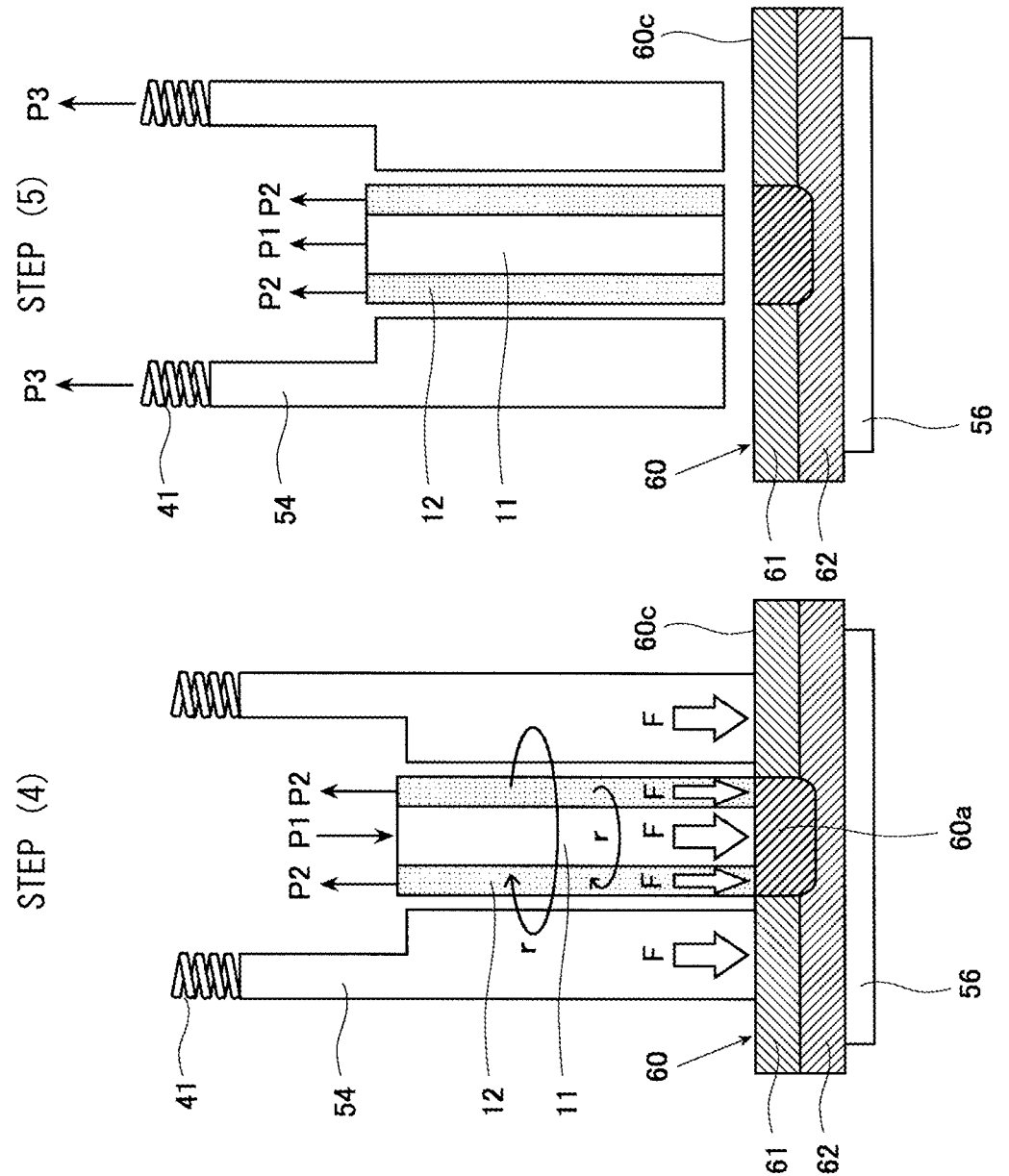
FIG. 6B is a process diagram schematically showing one example of steps of the friction stir spot welding performed by the friction stir spot welder according to Embodiment 2.

FIGS. 5A and 5B are flowcharts showing one example of the operation of the friction stir spot welder 50 according to Embodiment 2. FIGS. 6A and 6B are process diagrams schematically showing one example of steps of the friction stir spot welding performed by the friction stir spot welder 50 according to Embodiment 2.

FIGS. 6A and 6B show an example in which the first workpiece 61 and the second workpiece 62 are used as the workpiece 60 and are laminated on each other and coupled to each other by spot welding. In FIGS. 6A and 6B, part of the friction stir spot welder 50 is not shown. Arrows r indicate the rotational directions of the pin 11 and the shoulder 12, and block arrows F indicate directions of forces applied to the first workpiece 61 and the second workpiece 62.

Moreover, although forces are applied to the first workpiece 61 and the second workpiece 62 also from the backing structure 56, such forces are not shown in FIGS. 6A and 6B for convenience of explanation. Furthermore, in FIGS. 6A and 6B, the shoulder 12 is shown by cross hatching so as to be clearly distinguished from the pin 11 and the clamp structure 13.

First, a worker (operator) places the workpiece 60 on the supporting surface 56a of the backing structure 56. Next, the worker manipulates the inputter 32 to input execution of welding of the workpiece 60 to the circuitry 51. A robot may place the workpiece 60 on the supporting surface 56a of the backing structure 56.

Then, as shown in FIG. 5A, the circuitry 51 drives the rotary driver 57 to rotate the pin 11 and the shoulder 12 at a preset and predetermined first rotational frequency (for example, 200 to 3,000 rpm) (Step S201; see Step (1) in FIG. 6A).

Next, while driving the advance-retract driver 53 (shoulder driver 532) to rotate the pin 11 and the shoulder 12, the circuitry 51 makes the pin 11, the shoulder 12, and the clamp structure 13 approach the workpiece 60 and brings the tip surface 11a of the pin 11, the tip surface 12a of the shoulder 12, and the tip surface 13a of the clamp structure 13 (not shown in FIGS. 6A and 6B) into contact with a front surface 60c (welded portion of the workpiece 60) of the workpiece 60 (Step S202; see Step (2) in FIG. 6A).

At this time, the circuitry 51 controls the advance-retract driver 53 (shoulder driver 532) such that the pin 11, the shoulder 12, and the clamp structure 13 press the workpiece 60 by a preset and predetermined pressing force (for example, a predetermined value within a range of 3 kN to 15 kN).

Therefore, the circuitry 51 determines whether or not the pressure detector 33 has detected predetermined pressure (for example, 3 kN to 15 kN) (Step S203). With this, the circuitry 51 can be determine whether or not the tip surface 11a of the pin 11, the tip surface 12a of the shoulder 12, and the tip surface 13a of the clamp structure 13 have contacted the front surface 60c of the workpiece 60.

When the circuitry 51 determines that the pressure detector 33 has not detected the predetermined pressure (No in Step S203), the circuitry 51 repeatedly performs Steps S202 and S203 until the pressure detector 33 detects the predetermined pressure.

On the other hand, when the circuitry 51 determines that the pressure detector 33 has detected the predetermined pressure (Yes in Step S203), the circuitry 51 executes Step S204.

When the tip surface 11a of the pin 11, the tip surface 12a of the shoulder 12, and the tip surface 13a of the clamp structure 13 are brought into contact with the front surface 60c of the workpiece 60, the first workpiece 61 and the second workpiece 62 are sandwiched between the clamp structure 13 and the backing structure 56. Then, the clamp structure 13 is biased toward the front surface 60c of the workpiece 60 by the contraction of the clamp driver 41 to generate clamping force.

Moreover, in this state, since the pin 11 and the shoulder 12 do not advance or retract, the front surface 60c of the workpiece 60 is subjected to "preheating." With this, a constituent material at a contact region of the first workpiece 61 is softened by heat generated by friction, and thus, a plastically flowing portion 60a is generated in the vicinity of the front surface 60c of the workpiece 60.

In Step S204, the circuitry 51 drives the advance-retract driver 53 such that the tip surface 11a of the pin 11 projects relative to the tip surface 12a of the shoulder 12. At this time, the circuitry 51 may drive the advance-retract driver 53 (pin driver 531) such that the pin 11 is pressed in the workpiece 60. Moreover, the circuitry 51 may drive the advance-retract driver 53 (shoulder driver 532) such that the shoulder 12 separates from the workpiece 60.

With this, the tip portion of the pin 11 is pressed in the welded portion of the workpiece 60 while rotating.

Next, the circuitry 51 acquires, from the speed detector 35, the speed information of the pin 11 in the axial direction which is detected by the speed detector 35 (Step S205). Next, the circuitry 51 determines whether or not the speed information (speed) acquired in Step S205 is a preset and predetermined first speed (Step S206).

When the circuitry 51 determines that the speed information acquired in Step S205 is not the first speed (No in Step S206), the circuitry 51 returns to Step S205. The circuitry 51 repeatedly performs Steps S205 and S206 until the speed information acquired in Step S205 becomes the first speed.

On the other hand, when the circuitry 51 determines that the speed information acquired in Step S205 is the first speed (Yes in Step S206), the circuitry 51 acquires the time information from the timer 36 (Step S207). Specifically, the circuitry 51 acquires from the timer 36 a time elapsed since the circuitry 51 has determined that the speed information acquired in Step S205 is the first speed.

The circuitry 51 determines whether or not the time information (time elapsed since the circuitry 51 has determined that the speed information acquired in Step S205 is the first speed) acquired in Step S207 is longer than a preset first period of time (Step S208).

When the circuitry 51 determines that the time information acquired in Step S207 is not longer than the first period of time (No in Step S208), the circuitry 51 returns to Step S207. The circuitry 51 repeatedly performs Steps S207 and S208 until the time information acquired in Step S207 becomes longer than the first period of time.

On the other hand, when the circuitry 51 determines that the time information acquired in Step S207 is longer than the first period of time (Yes in Step S208), the circuitry 51 acquires the positional information of the tip of the pin 11 from the position detector 34 (Step S209; see FIG. 6B). Then, the circuitry 51 determines whether or not the positional information of the tip of the pin 11 which is acquired in Step S209 has reached the preset and predetermined first position (Step S210).

Herein, the first position can be preset based on experiments or the like and is an arbitrary position away by 0.3 mm or less from the contact surface 62a of the second workpiece 62 which is in contact with the first workpiece 61.

With this, the tip surface 11a of the pin 11 reaches the arbitrary position (i.e., the first position) away from the contact surface 62a of the second workpiece 62 by 0.3 mm or less. Then, the new surface is formed at a portion of the second workpiece 62 which is in contact with the pin 11 and/or a portion of the second workpiece 62 which is in contact with the plastically flowing portion 60a.

A softened material of the plastically flowing portion 60a is pushed away by the pin 11 to flow from a position right under the pin 11 to a position right under the shoulder 12. Therefore, the shoulder 12 retracts and moves upward relative to the pin 11 (see Step (3A) in FIG. 6A).

When the circuitry 51 determines that the positional information of the tip of the pin 11 acquired in Step S209 has not yet reached the first position (No in Step S210), the circuitry 51 returns to Step S209. The circuitry 51 repeatedly performs Steps S209 and S210 until the circuitry 51 determines that the positional information of the tip portion of the pin 11 acquired in Step S209 has reached the first position.

On the other hand, when the circuitry 51 determines that the positional information of the tip of the pin 11 acquired in Step S209 has reached the first position (Yes in Step S210), the circuitry 51 executes Step S211.

In Step S211, the circuitry 51 drives the advance-retract driver 53 (shoulder driver 532) such that the shoulder 12 advances toward the workpiece 60, and/or the circuitry 51 drives the advance-retract driver 53 (pin driver 531) such that the pin 11 separates from the workpiece 60.

Specifically, the circuitry 51 controls the advance-retract driver 53 such that almost no level difference is generated between the tip surface 11a of the pin 11 and the tip surface 12a of the shoulder 12 (the tip surface 11a of the pin 11 and the tip surface 12a of the shoulder 12 are flush with each other).

With this, the shoulder 12 gradually advances toward the first workpiece 61, and the pin 11 retracts from the first workpiece 61. At this time, the softened portion of the plastically flowing portion 60a flows from the position right under the shoulder 12 to the position right under the pin 11.

Then, the tip surface 11a of the pin 11 and the tip surface 12a of the shoulder 12 move to the vicinity of the front surface 60c of the workpiece 60. With this, the front surface 60c of the workpiece 60 is shaped, and a substantially flat surface where recesses are not practically generated is obtained (see Step (4) in FIG. 6B).

It is preferable that the circuitry 51 control the advance-retract driver 53 in Step S204 and/or Step S211 so as to reduce an absolute value of a tool average position Tx defined by Formula (I) below.

$$Ap \cdot Pp + As \cdot Ps = Tx \quad (I)$$

In Formula (I), Ap denotes the area of the tip surface of the pin 11, As denotes the area of the tip surface of the shoulder 12, Pp denotes a press-in depth of the pin 11, and Ps denotes a press-in depth of the shoulder 12. It is more preferable that the circuitry 51 control the advance-retract driver 53 such that the tool average position Tx becomes zero. Since specific control of reducing the absolute value of the tool average position Tx is disclosed in Japanese Laid-Open Patent Application Publication No. 2012-196682 in detail, an explanation thereof is omitted herein.

Moreover, the circuitry 51 may control the advance-retract driver 53 in Step S211 such that the tip surface 12a of the shoulder 12 reaches the first position. In this case, after the tip surface 12a of the shoulder 12a reaches the first position, the circuitry 51 may control the advance-retract driver 53 such that the tip surface 11a of the pin 11 and the tip surface 12a of the shoulder 12 become flush with each other.

Next, the circuitry 51 drives the advance-retract driver 53 such that the pin 11, the shoulder 12, and the clamp structure 13 separate from the workpiece 60 (Step S212). Then, the circuitry 51 controls the rotary driver 57 to stop the rotation of the pin 11 and the shoulder 12 (Step S213; see Step (5) in FIG. 6B) and terminates the present program (step of welding the workpiece 60).

With this, since the rotation (and pressing) of the pin 11 and the shoulder 12 during the contact of the pin 11 and the shoulder 12 with the first workpiece 61 and the second workpiece 62 is not applied to the first workpiece 61 and the second workpiece 62, the plastic flow stops at the plastically flowing portion 60a, and the plastically flowing portion 60a and the new surface of the second workpiece 62 are welded to each other.

In the friction stir spot welder 50 according to Embodiment 2 configured as above, in a state where the speed of the rotating pin 11 in the axial direction is the first speed, the circuitry 51 determines whether or not the first period of time has elapsed.

With this, the circuitry 51 can more clearly (more accurately) determine that the tip of the pin 11 has reached the contact surface 62a of the second workpiece 62 which is in contact with the first workpiece 61.

In the friction stir spot welder 50 according to Embodiment 2, after the circuitry 51 determines that the first period of time has elapsed in a state where the speed of the rotating pin 11 in the axial direction is the first speed, the circuitry 51 operates the advance-retract driver 53 such that the tip of the pin 11 reaches the first position. However, the present embodiment is not limited to this.

After the circuitry 51 determines that the first period of time has elapsed in a state where the speed of the rotating pin 11 in the axial direction is the first speed, the circuitry 51 may make the movement of the pin 11 stand by until a predetermined second period of time further elapses. Moreover, after the circuitry 51 determines that the second period of time has elapsed, the circuitry 51 may drive the advance-retract driver 53 (shoulder driver 532) such that the shoulder 12 moves toward the workpiece 60, and/or the circuitry 51 may drive the advance-retract driver 53 (pin driver 531) such that the pin 11 separates from the workpiece 60.

Test Example According to Embodiment 1

Next, a welding test of the workpiece 60 by using the friction stir spot welder 50 according to Embodiment 1 will be described.

Test Example 1

The welding test of the workpiece 60 was executed by using the friction stir spot welder 50 according to Embodiment 1. The position of the tip of the shoulder 12, the speed of the shoulder 12 in the axial direction, and the current value having flowed through the rotary driver 57 that rotated the shoulder 12 were plotted.

Welding Condition 1

Used as the first workpiece 61 was an aluminum plate (A6061-T6) having a thickness of 0.99 mm, and used as the second workpiece 62 was a 980 MPa class high tensile strength steel plate having a thickness of 1.2 mm. Moreover, a first rotational frequency as the rotational frequency of each of the pin 11 and the shoulder 12 was set to 2,000 rpm, and the pressing force of each of the pin 11, the shoulder 12, and the clamp structure 13 was set to 14.7 kN.

The first position as a target reaching position of the shoulder 12 was set to a position located downward by 0.04 mm from the contact surface 62a of the second workpiece 62 which is in contact with the first workpiece 61.

Comparative Example 1

The welding test of the workpiece 60 was executed by using the friction stir spot welder 50 according to Embodiment 1. The current value having flowed through the rotary driver 57 that rotated the shoulder 12 was plotted.

Welding Condition 2

Used as the first workpiece 61 was an aluminum plate (A6061-T6) having a thickness of 0.99 mm, and used as the second workpiece 62 was a 980 MPa class high tensile strength steel plate having a thickness of 1.2 mm. Moreover, the first rotational frequency as the rotational frequency of each of the pin 11 and the shoulder 12 was set to 2,000 rpm, and the pressing force of each of the pin 11, the shoulder 12, and the clamp structure 13 was set to 14.7 kN.

The first position as the target reaching position of the shoulder 12 was set to a position located downward by 0.06 mm from the contact surface 62a of the second workpiece 62 which is in contact with the first workpiece 61.

Test Results

Figure 7:
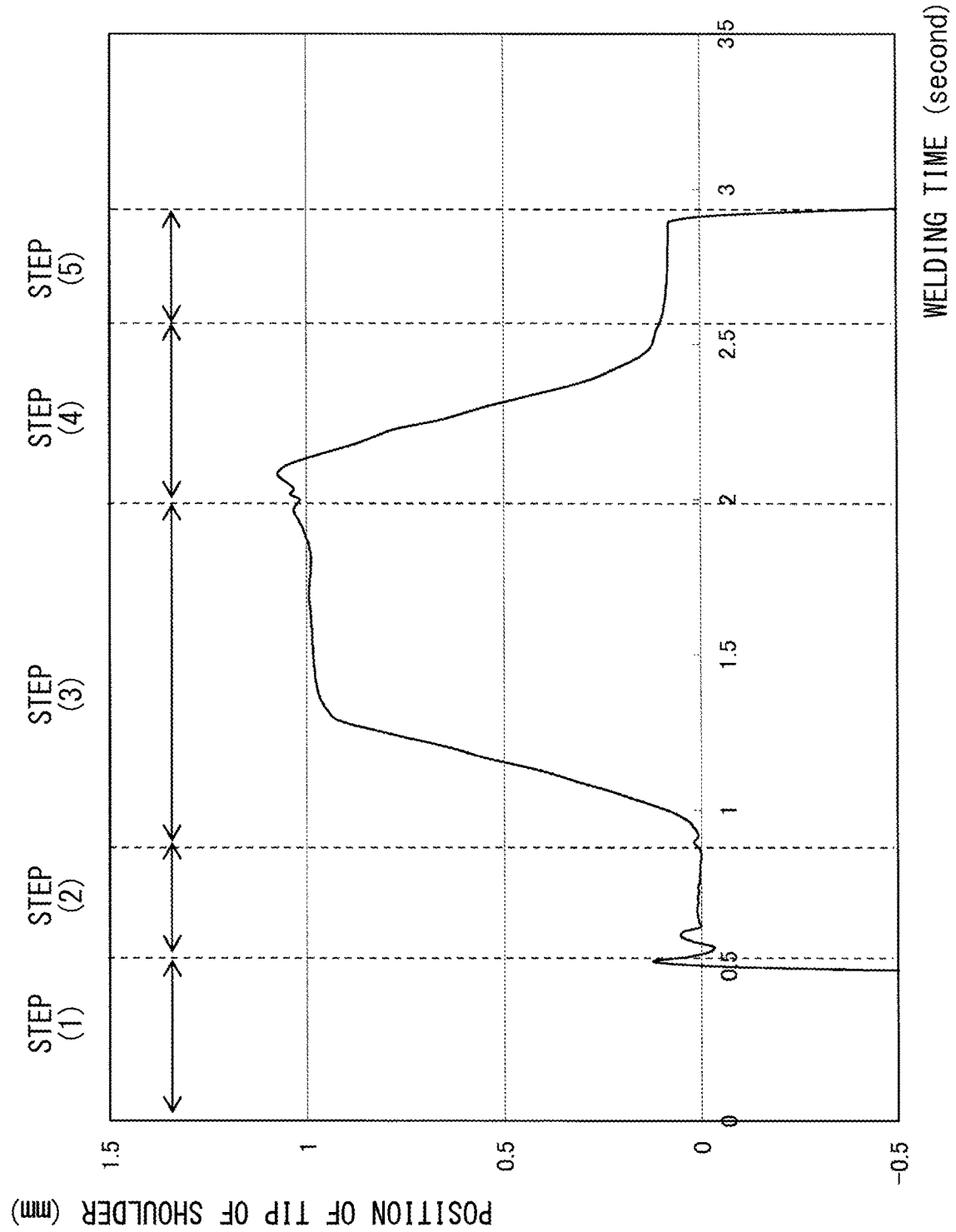
FIG. 7 is a graph obtained by plotting the position of the tip of the shoulder with respect to a welding time when the friction stir spot welding was performed under Welding Condition 1 by using the friction stir spot welder according to Test Example 1.
Figure 8:
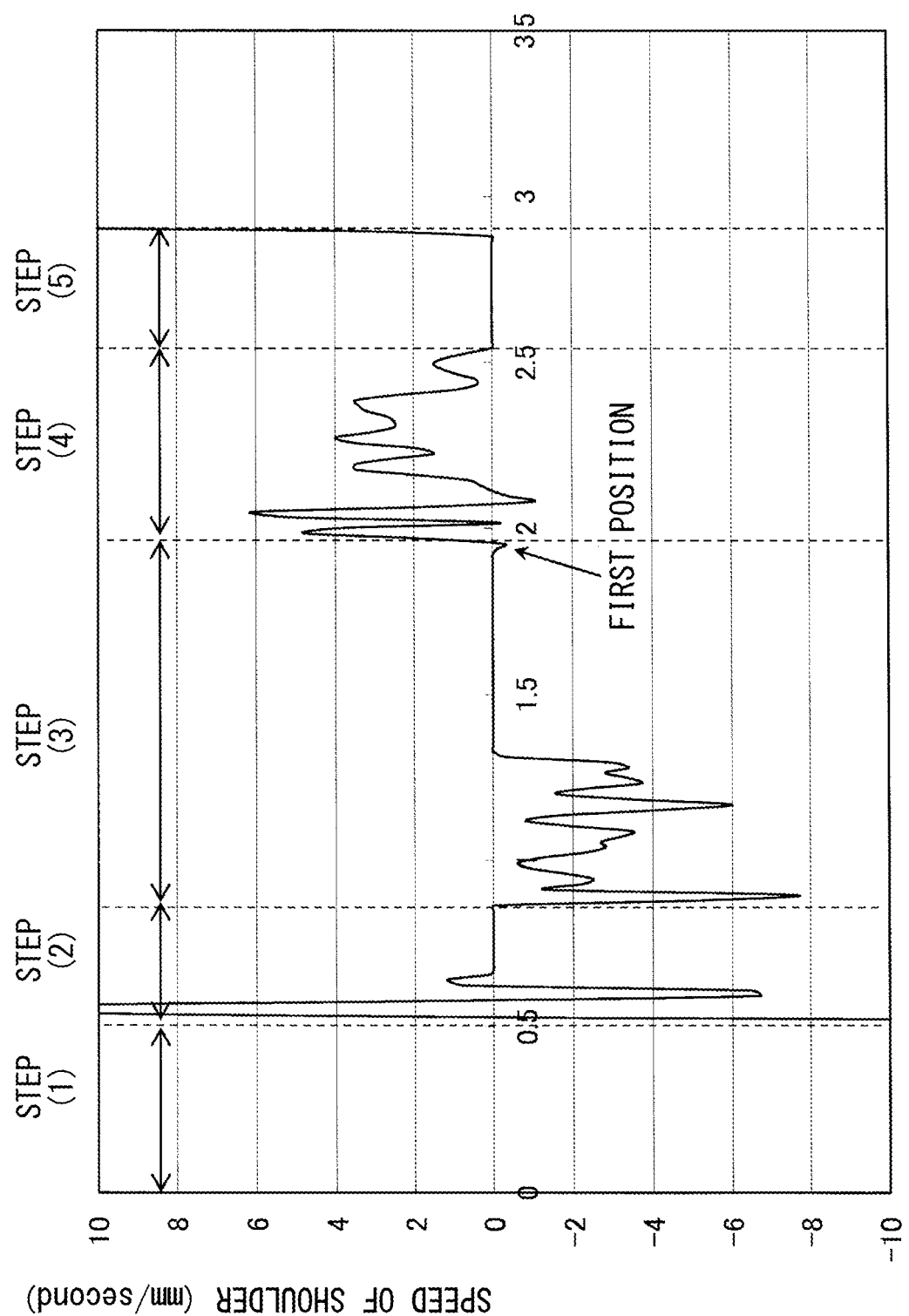
FIG. 8 is a graph obtained by plotting the speed of the shoulder in an axial direction with respect to the welding time when the friction stir spot welding was performed under Welding Condition 1 by using the friction stir spot welder according to Test Example 1.
Figure 9:
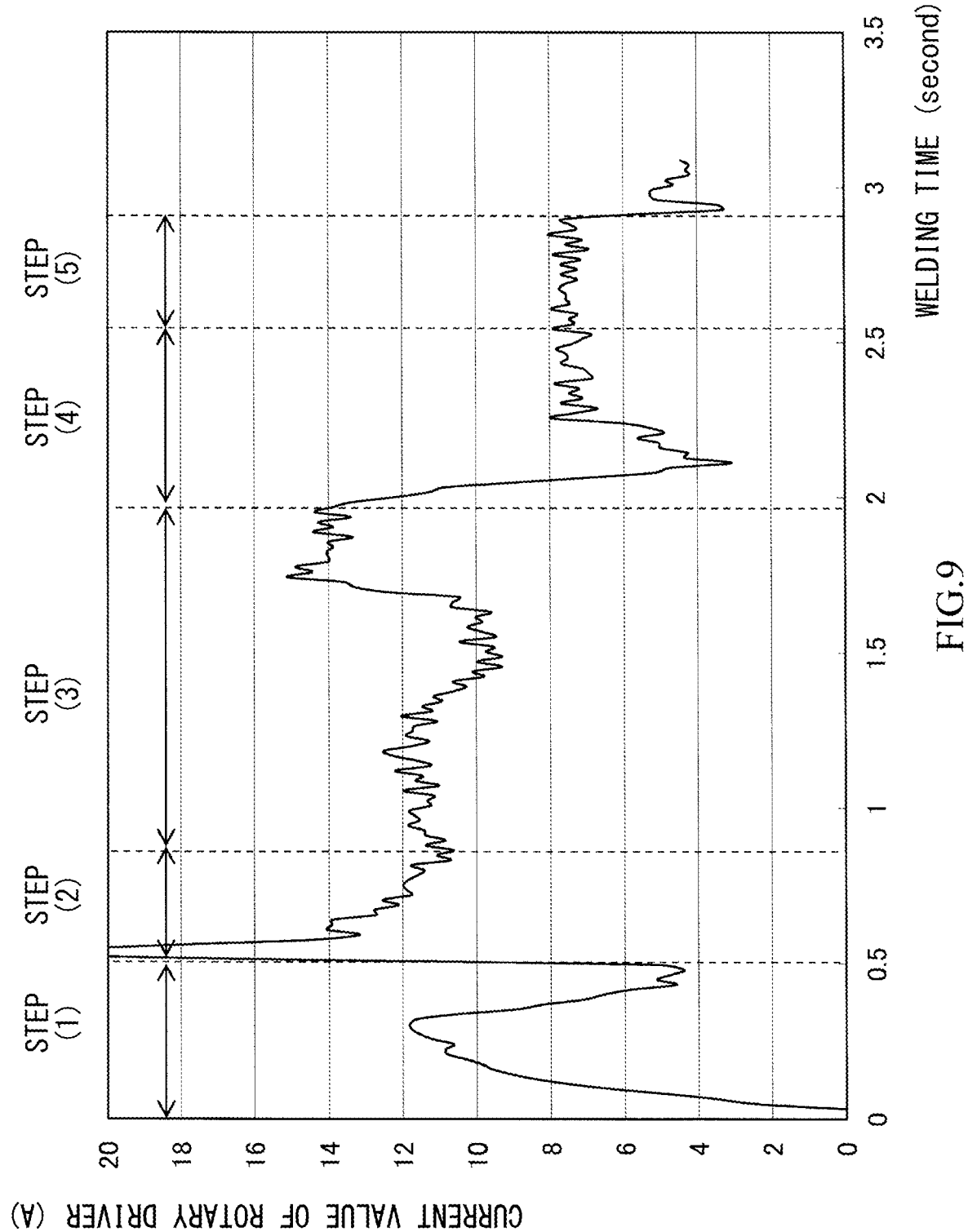
FIG. 9 is a graph obtained by plotting a current value having flowed through a rotary driver with respect to the welding time when the friction stir spot welding was performed under Welding Condition 1 by using the friction stir spot welder according to Test Example 1.
Figure 10:
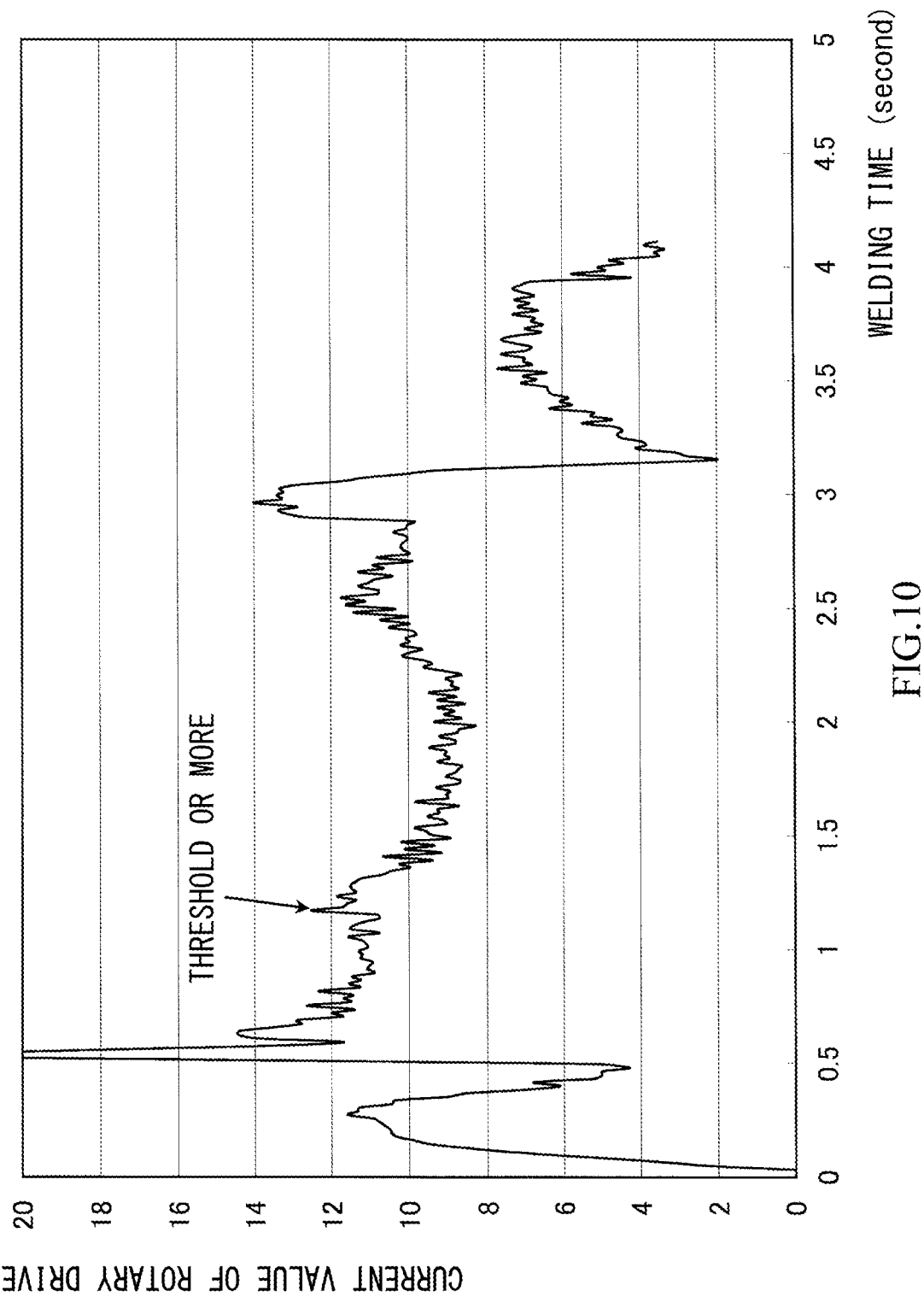
FIG. 10 is a graph obtained by plotting the current value having flowed through the rotary driver with respect to the welding time when the friction stir spot welding was performed under Welding Condition 2 by using the friction stir spot welder according to Comparative Example 1.

FIG. 7 is a graph obtained by plotting the position of the tip of the shoulder with respect to a welding time when the friction stir spot welding was performed under Welding Condition 1 by using the friction stir spot welder 50 according to Test Example 1. FIG. 8 is a graph obtained by plotting the speed of the shoulder in the axial direction with respect to the welding time when the friction stir spot welding was performed under Welding Condition 1 by using the friction stir spot welder 50 according to Test Example 1. FIG. 9 is a graph obtained by plotting the current value having flowed through the rotary driver 57 with respect to the welding time when the friction stir spot welding was performed under Welding Condition 1 by using the friction stir spot welder 50 according to Test Example 1. FIG. 10 is a graph obtained by plotting the current value having flowed through the rotary driver 57 with respect to the welding time when the friction stir spot welding was performed under Welding Condition 2 by using the friction stir spot welder 50 according to Comparative Example 1.

In FIGS. 7 to 10, the welding time denotes an elapsed time since the circuitry 51 has started a welding program shown in FIGS. 3A and 3B. In FIG. 7, the front surface 60c of the workpiece 60 is defined as zero. Moreover, a direction of the press-in to the workpiece 60 is shown as positive, and a direction away from the workpiece 60 is shown as negative. Furthermore, in FIG. 8, a direction from the upper surface of the first workpiece 61 (the front surface 60c of the workpiece 60) toward the contact surface 62a of the second workpiece 62 is shown as negative, and a direction from the contact surface 62a of the second workpiece 62 toward the upper surface of the first workpiece 61 is shown as positive. Furthermore, Steps (1) to (5) in FIGS. 7 to 9 correspond to Steps (1) to (5) shown in FIGS. 4A and 4B.

As shown in FIG. 8, in Step (3) in which the tip portion of the shoulder 12 is pressed in the welded portion of the workpiece 60 while rotating, the speed of the shoulder 12 in the axial direction is 0 mm/second in a period from 1.3 seconds to 1.9 seconds.

Then, as shown in FIG. 7, when the welding time is 1.3 seconds to 1.9 seconds, the position of the tip of the shoulder 12 is around 0.99 mm. It is thought that the position of the tip of the shoulder 12 is around 0.99 mm because the shoulder 12 is bent by pressure applied to the shoulder 12, and a measurement load varies.

Therefore, it is assumed that in the period from 1.3 seconds to 1.9 seconds, the tip of the shoulder 12 is located on the contact surface 62a of the second workpiece 62 which is in contact with the first workpiece 61.

This indicates that by determining whether or not the first period of time has elapsed in a state where the speed of the rotating shoulder 12 in the axial direction is the first speed, the circuitry 51 can determine whether or not the tip of the shoulder 12 has reached the contact surface 62a of the second workpiece 62 which is in contact with the first workpiece 61.

Moreover, as shown in FIG. 8, when the welding time is 1.9 seconds to 1.95 seconds, the speed of the shoulder 12 in the axial direction is −0.3 mm/second. It is thought that this indicates that the tip of the shoulder 12 was pressed in the second workpiece 62 from the contact surface 62a of the second workpiece 62 which is in contact with the first workpiece 61, and reached the first position.

On the other hand, as shown in FIG. 9, in a case where the current value having flowed through the rotary driver 57 with respect to the welding time when the friction stir spot welding was performed under Welding Condition 1 by using the friction stir spot welder 50 according to Test Example 1 is plotted, it is difficult to determine when the current value has exceeded a predetermined threshold.

However, it is assumed that as shown in FIG. 10, in a case where the current value having flowed through the rotary driver 57 with respect to the welding time when the friction stir spot welding was performed under Welding Condition 2 by using the friction stir spot welder 50 according to Comparative Example 1 is plotted, the current value significantly changed and exceeded the predetermined threshold when the welding time was around 1.25 seconds.

This indicates that according to the different-metals welding method disclosed in PTL 1, that the tip of the shoulder 12 or the tip of the pin 11 has reached the contact surface 62a of the second workpiece 62 which is in contact with the first workpiece 61 can be determined in some cases but cannot be determined in the other cases, and there is still room for improvement.

Embodiment 3

Embodiment 3 will be described using the friction stir spot welder 50 (see FIG. 1). The friction stir spot welder 50 is the same in basic configuration as the friction stir spot welder 50 according to Embodiment 1. Herein, details of the friction stir spot welder 50 and the method of operating the friction stir spot welder 50 which are different from the details of Embodiment 1 will be described, and the repetition of the same explanation is avoided.

Operation and Operational Advantages of Friction Stir Spot Welder

The operation of the friction stir spot welder 50 according to Embodiment 3 will be described. The following operation is executed in such a manner that the circuitry 51 (see FIG. 2) reads a program stored in the storage 31 (see FIG. 2).

Figure 11:
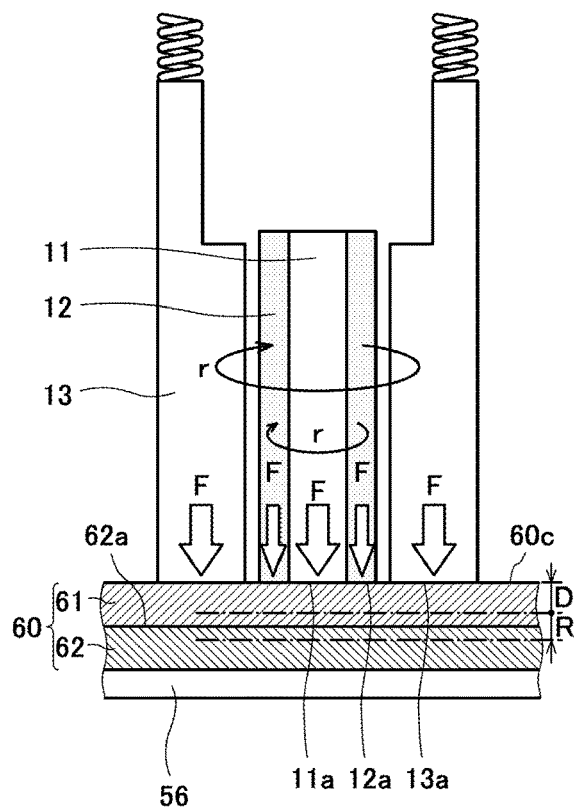
FIG. 11 is an explanatory diagram of the friction stir spot welding performed by the friction stir spot welder according to Embodiment 3.

FIG. 11 shows that in the friction stir spot welder 50, the tip surface 11a of the pin 11, the tip surface 12a of the shoulder 12, and the tip surface 13a of the clamp structure 13 are in contact with the front surface 60c of the workpiece 60. Two arrows R indicate a detection range including the contact surface 62a of the second workpiece 62. The detection range R is a range where whether or not the tip of the shoulder 12 has reached the contact surface 62a is determined by the circuitry 51. Two arrows D indicate a distance from the upper surface of the first workpiece 61 (the front surface 60c of the workpiece 60) to the detection range R.

The operation in Embodiment 3 is different from the operation in Embodiment 1 in that the detection range R is set. Therefore, Embodiment 3 is different from Embodiment 1 regarding Steps S105 and S106 in FIG. 3A. The other steps in Embodiment 3 are the same as those in Embodiment 1.

As with the operation of the friction stir spot welder 50 according to Embodiment 1, Steps S101 to S104 are executed as shown in FIG. 3A. Then, Steps S105 and S106 are executed. Steps S105 and S106 will be described with reference to FIGS. 12A, 12B, and 12C.

Figure 12A:
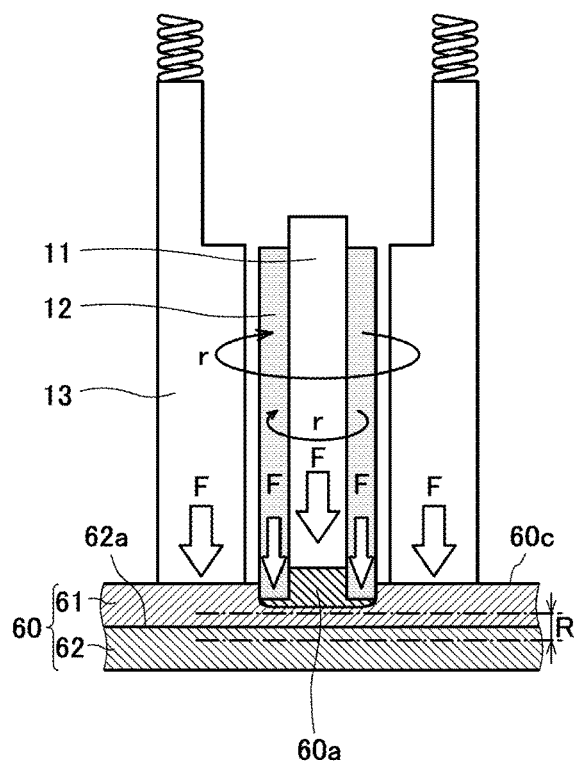
FIG. 12A is an explanatory diagram of a used state of the friction stir spot welder according to Embodiment 3, i.e., a state where the shoulder is pressed in a workpiece.
Figure 12B:
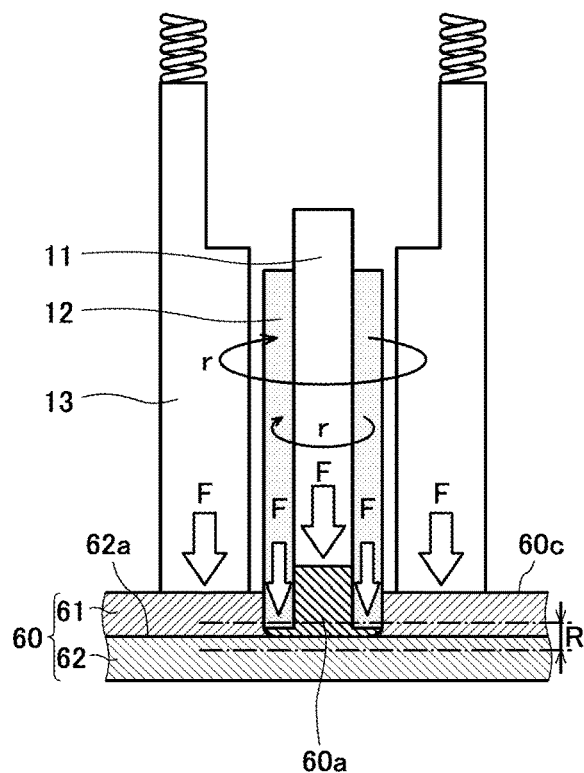
FIG. 12B is an explanatory diagram of a used state of the friction stir spot welder according to Embodiment 3, i.e., a state where the shoulder is pressed in the workpiece more deeply than FIG. 12A.

FIG. 12A shows the shoulder 12 that has been pressed in the workpiece 60 in Step S105. In Step S105, the circuitry 51 acquires the speed information of the shoulder 12 in the axial direction. Moreover, the position detector 34 detects the position of the tip of the shoulder 12. The circuitry 51 determines whether or not the tip of the shoulder 12 is located in the detection range R. The circuitry 51 repeatedly performs Step S105 until the circuitry 51 determines that the tip of the shoulder 12 is located in the detection range R. As shown in FIG. 12B, when the circuitry 51 determines that the tip of the shoulder 12 is located in the detection range R, the circuitry 51 performs Step S106.

When the circuitry 51 determines in Step S106 that the speed information acquired in Step S105 is not the first speed, the circuitry 51 returns to Step S105 and repeatedly performs Steps S105 and S106.

Figure 12C:
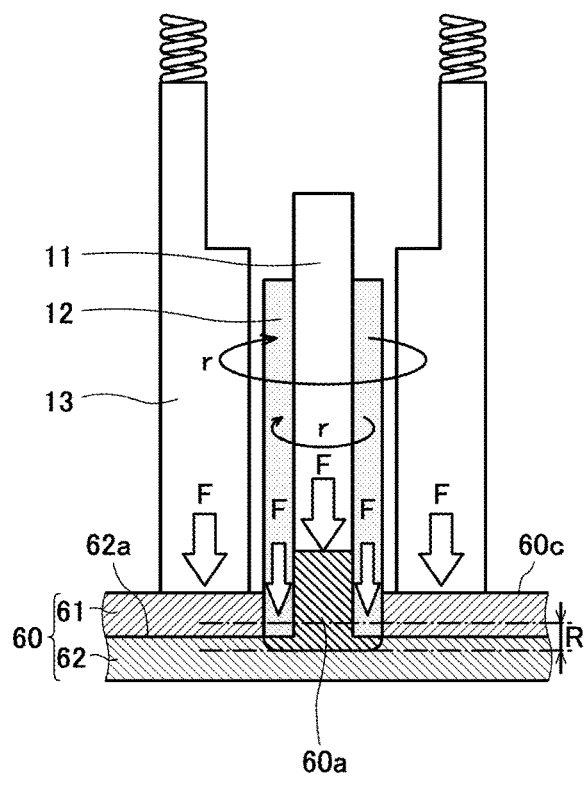
FIG. 12C is an explanatory diagram of a used state of the friction stir spot welder according to Embodiment 3, i.e., a state where the shoulder has reached a contact surface of a second workpiece.

Then, when the circuitry 51 determines that the speed information acquired in Step S105 is the first speed, the circuitry 51 acquires the time information from the timer 36 (Step S107). At this time, as shown in FIG. 12C, the tip of the shoulder 12 has reached the contact surface 62a of the second workpiece 62. In Step S107, the circuitry 51 acquires from the timer 36 a time elapsed since the circuitry 51 has determined that the speed information acquired in Step S105 is the first speed.

The circuitry 51 determines whether or not the time information (time elapsed since the circuitry 51 has determined that the speed information acquired in Step S105 is the first speed) acquired in Step S107 is longer than a preset first period of time (Step S108).

When the circuitry 51 determines that the time information acquired in Step S107 is not longer than the first period of time, the circuitry 51 returns to Step S107. The circuitry 51 repeatedly performs Steps S107 and S108 until the time information acquired in Step S107 becomes longer than the first period of time.

Then, when the circuitry 51 determines in Step S108 that the time information acquired in Step S107 is longer than the first period of time, the circuitry 51 executes Step S109 and the subsequent steps as shown in FIG. 3B.

In the friction stir spot welder 50, when the tip of the shoulder 12 is located in the set detection range R, the circuitry 51 determines whether or not the tip of the shoulder 12 has reached the contact surface 62a of the second workpiece 62. The detection range R is set as a range including the contact surface 62a of the second workpiece 62.

When the speed information becomes the first speed in a range outside the detection range R, erroneous determination of the circuitry 51 is prevented. The friction stir spot welder 50 can highly accurately determine whether or not the tip of the shoulder 12 has reached the contact surface 62a of the second workpiece 62.

By setting the detection range R to be small, the erroneous determination of the circuitry 51 is further suppressed. From this point of view, the detection range R is preferably smaller than the thickness of the first workpiece 61. Moreover, the detection range R is preferably 0.6 mm or less, more preferably 0.4 mm or less, and especially preferably 0.2 mm or less. Moreover, by reducing a ratio of the thickness of the first workpiece 61 to the detection range R, the erroneous determination of the circuitry 51 is further suppressed. From this point of view, the ratio of the thickness of the first workpiece 61 to the detection range R is preferably 60% or less, more preferably 40% or less, especially preferably 20% or less, and most preferably 10% or less.

In this operation, when the speed information becomes the first speed and the time information becomes longer than the first period of time in a range outside the detection range R, the erroneous determination of the circuitry 51 is prevented. By setting the detection range R, the erroneous determination is suppressed even when the first period of time is set to be short. Therefore, in the friction stir spot welder 50, the first period of time may be set to be short. By setting the detection range R, the erroneous determination of the circuitry 51 can be suppressed when the first period of time is, for example, 0.01 second or more. To suppress the erroneous determination of the circuitry 51, the first period of time is preferably 0.05 second or more.

In the friction stir spot welder 50, for example, the storage 31 stores the detection range R and the distance D which correspond to the workpiece 60. With this, based on the detection range R stored in the storage 31, the circuitry 51 determines whether or not the tip of the shoulder 12 has reached the contact surface 62a of the second workpiece 62.

Moreover, to set the detection range R including the contact surface 62a to be small, the circuitry 51 may correct the detection range R. For example, the position detector 34 detects the position of the tip of the shoulder 12 which is in contact with the front surface 60c of the workpiece 60. The circuitry 51 acquires: positional information indicating that the tip of the shoulder 12 is in contact with the front surface 60c (see FIG. 11); and positional information indicating that the tip of the shoulder 12 has reached the contact surface 62a of the second workpiece 62 (see FIG. 12C). Based on these pieces of positional information, the circuitry 51 may correct the distance D and the detection range R shown in FIG. 11.

By such correction, influences of variations of the thickness of the first workpiece 61 and the thickness of the second workpiece 62 are suppressed. By this correction, the detection range R may be set to be further small without excluding the contact surface 62a.

Herein, the correction is performed based on the front surface 60c of the workpiece 60 and the contact surface 62a of the second workpiece 62 but is not limited to this. For example, the thickness of the first workpiece 61 may be measured, and the distance D and the detection range R may be corrected based on this thickness. Moreover, the thickness of the workpiece 60 may be measured, and the distance D and the detection range R may be corrected based on this thickness. Furthermore, the detection range R may be set as a range including the contact surface 62a of the second workpiece 62. For example, the contact surface 62a of the second workpiece 62 may be specified and defined as a median of the detection range R without using the distance D.

Moreover, in Steps S109 and S110, instead of determining whether or not the shoulder 12 has reached the first position, whether or not a predetermined maintaining time has elapsed may be determined. To be specific, after the tip of the shoulder 12 has reached the contact surface 62a of the second workpiece 62, the rotation and pressing force of the shoulder 12 are maintained. In this state, the circuitry 51 may determine whether or not the predetermined maintaining time has elapsed. After the circuitry 51 determines that the predetermined maintaining time has elapsed, the circuitry 51 may execute Step S11 and the subsequent steps.

Herein, the friction stir spot welder 50 according to Embodiment 1 is used. However, setting the detection range R is also applicable to the friction stir spot welder 50 according to Embodiment 2.

To be specific, in the friction stir spot welder 50 according to Embodiment 2, the circuitry 51 may set the detection range R including the contact surface 62a. When the tip of the pin 11 is located in the detection range R, and the first period of time has elapsed in a state where the speed of the rotating pin 11 in the axial direction is the first speed, the circuitry 51 may determine that the tip of the pin 11 has reached the contact surface 62a of the second workpiece 62.

Test Example According to Embodiment 3

Next, the welding test of the workpiece 60 by using the friction stir spot welder 50 according to Embodiment 3 will be described.

Test Example 2

The welding test of the workpiece 60 was executed by using the friction stir spot welder 50 according to Embodiment 3. In Test Example 2, after the tip of the shoulder 12 reached the contact surface 62a of the second workpiece 62 after Step S108, the rotation and pressing force of the shoulder 12 were maintained. This state was maintained for the predetermined maintaining time. Then, Step S111 was executed. The maintaining time was 0.2 second. The other details of the welding condition were the same as those of Welding Condition 1 of Test Example 1. To be specific, the first workpiece 61, the second workpiece 62, the rotational frequencies of the pin 11 and the shoulder 12, and the pressing forces of the pin 11, the shoulder 12, and the clamp structure 13 were the same as those in Welding Condition 1. The detection range R was set to 0.6 mm. Specifically, the detection range R was set to a range of +− (plus-minus) 0.3 mm from the median that is the contact surface 62a. The first period of time was set to 0.10 second.

Test Examples 3-4

In Test Example 3, the first period of time was set to 0.05 second. In Test Example 4, the first period of time was set to 0.01 second. The other details of the welding condition were the same as those of Test Example 2.

Figure 13:
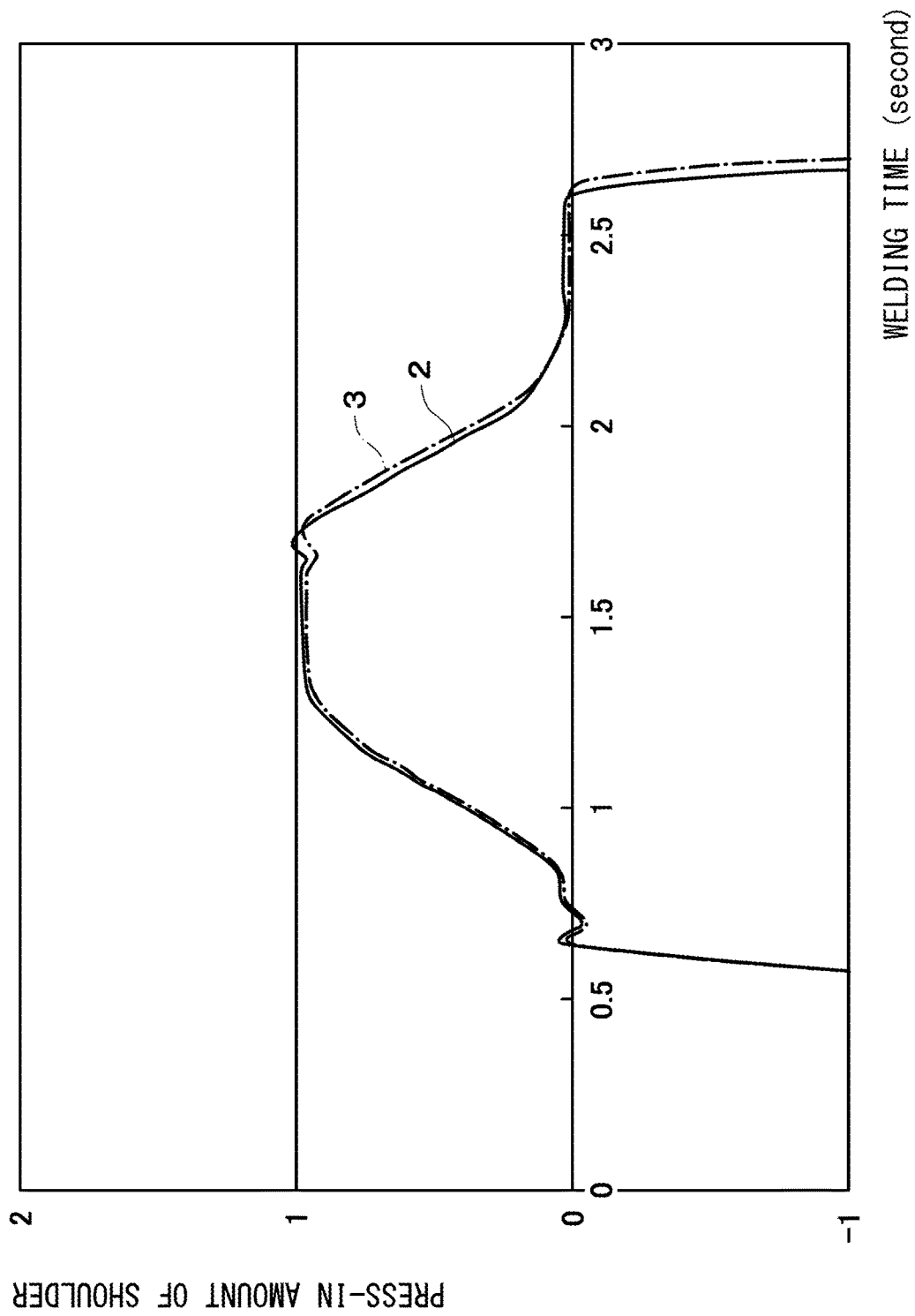
FIG. 13 is a graph obtained by plotting the position of the tip of the shoulder with respect to the welding time when the friction stir spot welding is performed in Test Examples 2 and 3.

A graph 2 in FIG. 13 is a graph obtained by plotting the position (press-in amount) of the tip of the shoulder with respect to the welding time in Test Example 2. A graph 3 in FIG. 13 is a graph obtained by plotting the position (press-in amount) of the tip of the shoulder with respect to the welding time in Test Example 3.

Figure 14:
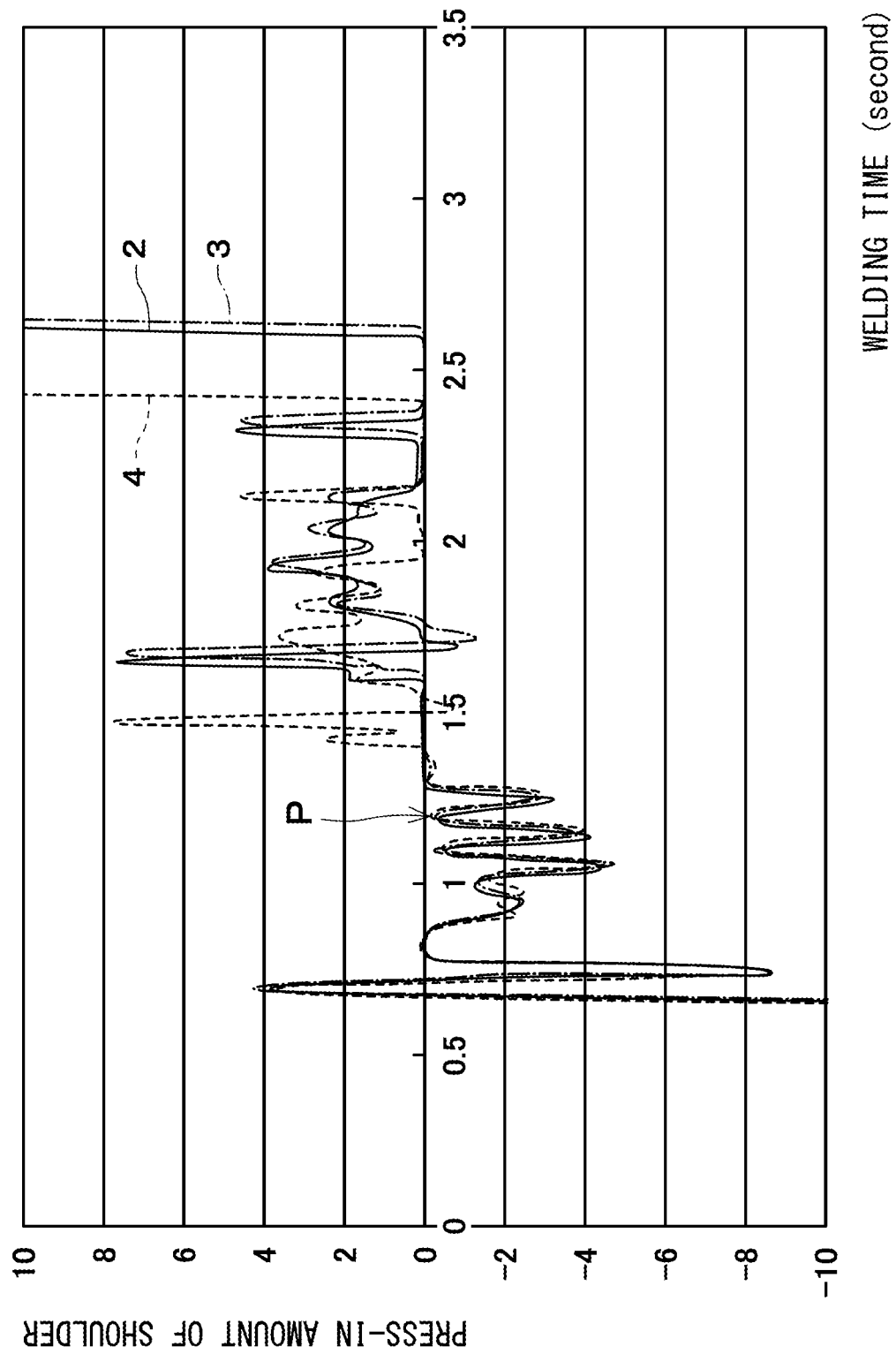
FIG. 14 is a graph obtained by plotting the speed of the shoulder in the axial direction with respect to the welding time when the friction stir spot welding is performed in Test Examples 2, 3, and 4.

A graph 2 in FIG. 14 is a graph obtained by plotting the speed of the shoulder in the axial direction with respect to the welding time in Test Example 2. A graph 3 in FIG. 14 is a graph obtained by plotting the speed of the shoulder in the axial direction with respect to the welding time in Test Example 3. A graph 4 in FIG. 14 is a graph obtained by plotting the speed of the shoulder in the axial direction with respect to the welding time in Test Example 4.

Test Examples 5-7

In Test Example 5, whether or not the shoulder 12 has reached the first position was determined in Steps S109 and S110. The detection range R was set to a range of +− (plus-minus) 0.3 mm from the contact surface 62a of the second workpiece 62. Moreover, the first period of time was set to 0.05 second, and the press-in amount to the first position was set to 0.10 mm. In Test Example 6, the press-in amount to the first position was set to 0.08 mm. The other details of the welding condition were the same as those in Test Example 5. In Test Example 7, the press-in amount to the first position was set to 0.05 mm. The other details of the welding condition were the same as those in Test Example 5.

Figure 15:
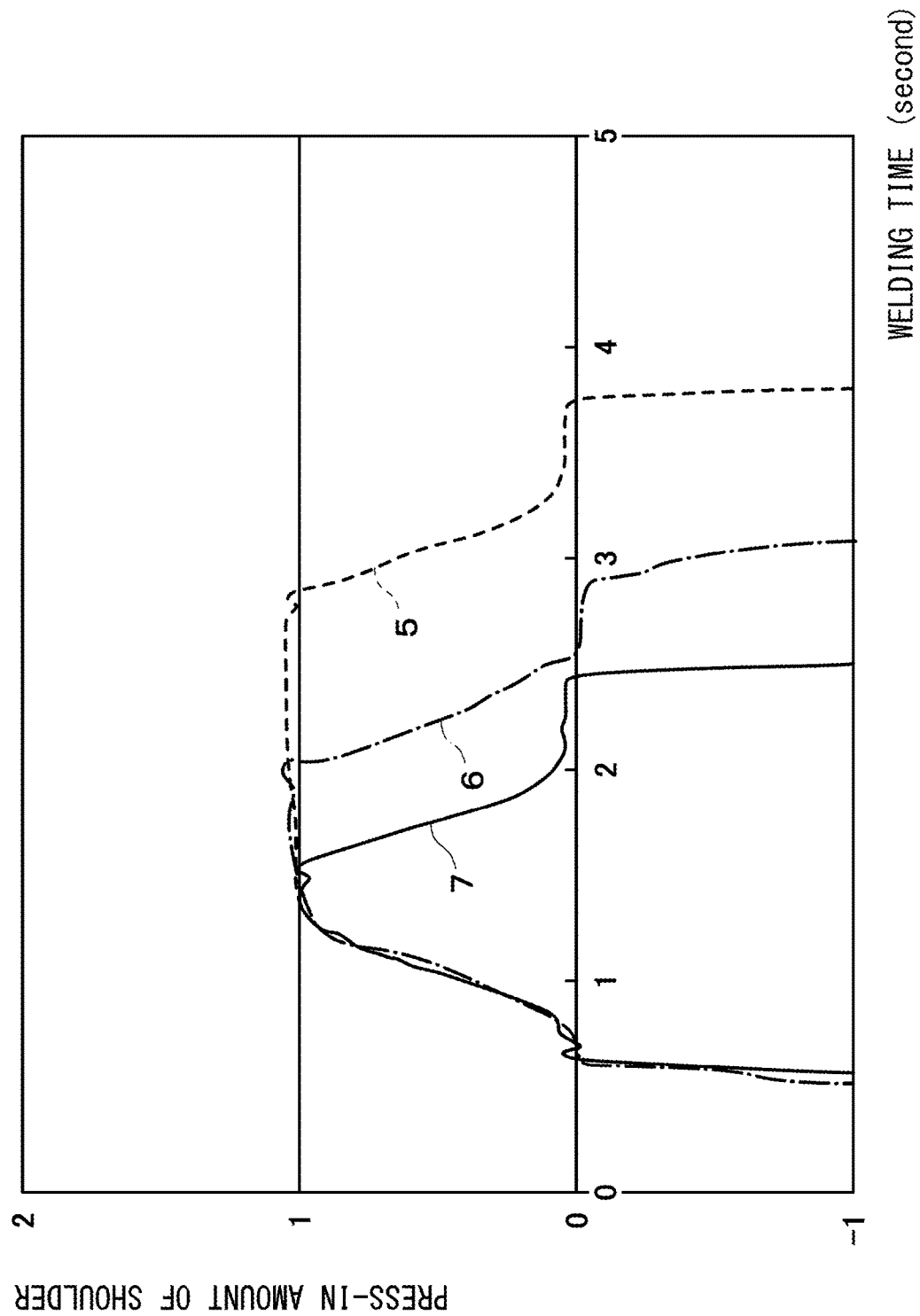
FIG. 15 is a graph obtained by plotting the position of the tip of the shoulder with respect to the welding time when the friction stir spot welding is performed in Test Examples 5, 6, and 7.

A graph 5 in FIG. 15 is a graph obtained by plotting the position (press-in amount) of the tip of the shoulder with respect to the welding time in Test Example 5. A graph 6 in FIG. 15 is a graph obtained by plotting the position (press-in amount) of the tip of the shoulder with respect to the welding time in Test Example 6. A graph 7 in FIG. 15 is a graph obtained by plotting the position (press-in amount) of the tip of the shoulder with respect to the welding time in Test Example 7.

In FIGS. 13, 14, and 15, the welding time denotes an elapsed time since the circuitry 51 has started the welding program shown in FIGS. 3A and 3B. In FIGS. 13 and 15, the front surface 60c of the workpiece 60 is defined as zero. Moreover, a direction of the press-in to the workpiece 60 is shown as positive, and a direction away from the workpiece 60 is shown as negative. Furthermore, in FIG. 14, a direction of the press-in from the upper surface of the first workpiece 61 (the front surface 60c of the workpiece 60) is shown as negative, and a direction away from the upper surface of the first workpiece 61 is shown as positive.

As shown in FIG. 14, in Test Examples 2 and 3, the tip portion of the shoulder 12 is pressed in the welded portion of the workpiece 60 while rotating, and the speed of the shoulder 12 in the axial direction is 0 mm/second in a period from 1.3 seconds to 1.6 seconds.

As shown in FIG. 13, in Test Examples 2 and 3, the position of the tip of the shoulder 12 is around 0.99 mm when the welding time is 1.3 seconds to 1.6 seconds. It is thought that the position of the tip of the shoulder 12 is around 0.99 mm because of the same reason as FIG. 7.

Therefore, it is assumed that in Test Examples 2 and 3, in the period from 1.3 seconds to 1.6 seconds, the tip of the shoulder 12 is located on the contact surface 62a of the second workpiece 62 which is in contact with the first workpiece 61. In Test Examples 2 and 3, by determining the predetermined maintaining time, the first workpiece 61 and the second workpiece 62 were welded to each other. In Test Examples 2 and 3, the first workpiece 61 and the second workpiece 62 were welded to each other without setting the press-in amount based on the first position.

On the other hand, as shown in FIG. 14, in Test Example 4, the tip portion of the shoulder 12 is pressed in the welded portion of the workpiece 60 while rotating, and the speed of the shoulder 12 in the axial direction is 0 mm/second in a period from 1.3 seconds to 1.4 seconds. It is thought that this is because since the first period of time was 0.01 second, the circuitry 51 erroneously determined by the speed at a position indicated by an arrow P that the tip of the shoulder 12 reached the contact surface 62a of the second workpiece 62. However, it was confirmed that even when the first period of time is 0.01 second, the erroneous determination does not occur by reconsidering the distance D and the detection range R.

As shown in FIG. 15, as the press-in amount to the first position increases, a period of time in which the position of the tip of the shoulder 12 is around 1 mm increases. In FIG. 15, the period of time increases as the press-in amount increases. It was confirmed that in Test Examples 5, 6, and 7, the set press-in amount is obtained.

In Test Examples 2-7, when the tip of the shoulder 12 is located in the detection range R, the circuitry 51 determined whether or not the first period of time has elapsed in a state where the speed of the shoulder 12 was the first speed. It was confirmed by Test Examples 2-7 that whether or not the tip of the shoulder 12 has reached the contact surface 62a of the second workpiece 62 can be accurately determined in the first period of time that is short.

From the foregoing explanation, many modifications and other embodiments of the present embodiment are obvious to one skilled in the art. Therefore, the foregoing explanation should be interpreted only as an example and is provided for the purpose of teaching the best mode for carrying out the present disclosure to one skilled in the art. The structures and/or functional details may be substantially modified within the scope of the present disclosure. In addition, various embodiments can be made by suitable combinations of components disclosed in the above embodiment.

INDUSTRIAL APPLICABILITY

The friction stir spot welder and the method of operating the friction stir spot welder are useful since it can be more clearly determined that the tip of the shoulder or the tip of the pin has reached the contact surface of the second workpiece which is in contact with the first workpiece.

The invention claimed is:

1. A friction stir spot welder that softens a workpiece including a first workpiece and a second workpiece by frictional heat to weld the workpieces,
   the friction stir spot welder comprising:
   a pin that is columnar;
   a shoulder that is cylindrical, the pin being within the shoulder;
   a rotary driver that rotates the pin and the shoulder about an axis that coincides with a center axis of the pin;
   an advance-retract driver that advances and retracts the pin and the shoulder along the axis; and
   circuitry, wherein:
   the first workpiece is located so as to be opposed to the pin and the shoulder and includes a material that is lower in melting point than a material of the second workpiece;
   the circuitry is configured to operate the rotary driver and the advance-retract driver such that the pin and the shoulder press a welded portion of the workpiece while rotating;
   the circuitry is configured to operate the rotary driver and the advance-retract driver such that the pin and the shoulder stir the workpiece;
   when a preset and predetermined first period of time has elapsed in a state where a speed of the rotating shoulder in an axial direction or a speed of the rotating pin in the axial direction is a preset and predetermined first speed, the circuitry is configured to determine that a tip of the shoulder or a tip of the pin has reached a contact surface of the second workpiece which is in contact with the first workpiece;
   the circuitry is configured to set a detection range that includes the contact surface and is smaller than a thickness of the first workpiece; and
   when the tip of the shoulder or the tip of the pin is located in the detection rang, and the preset and predetermined first period of time has elapsed in a state where the speed of the rotating shoulder in the axial direction or the speed of the rotating pin in the axial direction is the preset and predetermined first speed, the circuitry is configured to determine that the tip of the shoulder or the tip of the pin has reached the contact surface of the second workpiece which is in contact with the first workpiece.

2. The friction stir spot welder according to claim 1, wherein the first speed is −0.5 mm/second or more and +0.5 mm/second or less.

3. The friction stir spot welder according to claim 1, wherein the first period of time is 0.01 second or more and 0.5 second or less.

4. The friction stir spot welder according to claim 1, wherein after the circuitry determines that the tip of the shoulder or the tip of the pin has reached the contact surface of the second workpiece which is in contact with the first workpiece, the circuitry is configured to operate the advance-retract driver and the rotary driver such that the tip of the shoulder or the tip of the pin reaches a preset and predetermined first position in the second workpiece.

5. The friction stir spot welder according to claim 4, wherein the first position is a position away by 0.3 mm or less from the contact surface of the second workpiece which is in contact with the first workpiece.

6. The friction stir spot welder according to claim 1 wherein the detection range is 0.6 mm or less.

7. The friction stir spot welder according to claim 1, wherein a ratio of a thickness of the first workpiece to the detection range is 60% or less.

8. A method of operating a friction stir spot welder that softens a workpiece including a first workpiece and a second workpiece by frictional heat to weld the workpieces,
   the friction stir spot welder comprising:
   a pin that is columnar;
   a shoulder that is cylindrical, the pin being within the shoulder;
   a rotary driver that rotates the pin and the shoulder about an axis that coincides with a center axis of the pin;
   an advance-retract driver that advances and retracts the pin and the shoulder along the axis; and
   circuitry, wherein
   the first workpiece is located so as to be opposed to the pin and the shoulder and includes a material that is lower in melting point than a material of the second workpiece, the method comprising:

operating by the circuitry the rotary driver and the advance-retract driver such that the pin and the shoulder press a welded portion of the workpiece while rotating;

operating by the circuitry the rotary driver and the advance-retract driver such that the pin and the shoulder stir the workpiece;

when a preset and predetermined first period of time has elapsed in a state where a speed of the rotating shoulder in an axial direction or a speed of the rotating pin in the axial direction is a preset and predetermined first speed, determining by the circuitry that a tip of the shoulder or a tip of the pin has reached a contact surface of the second workpiece which is in contact with the first workpiece;

setting by the circuitry a detection range that includes the contact surface and is smaller than a thickness of the first workpiece; and when the tip of the shoulder or the tip of the pin is located in the detection rang, and the preset and predetermined first period of time has elapsed in a state where the speed of the rotating shoulder in the axial direction or the speed of the rotating pin in the axial direction is the preset and predetermined first speed, determining by the circuitry that the tip of the shoulder or the tip of the pin has reached the contact surface of the second workpiece which is in contact with the first workpiece.

\* \* \* \* \*